United States Patent
Hirao et al.

(10) Patent No.: US 8,845,904 B2
(45) Date of Patent: Sep. 30, 2014

(54) METHOD FOR OPERATING ION EXCHANGE EQUIPMENT

(75) Inventors: Masaaki Hirao, Matsuyama (JP); Saburo Nakamura, Matsuyama (JP); Shinichiro Teshima, Matsuyama (JP); Hajime Abe, Matsuyama (JP); Atsushi Kan, Matsuyama (JP); Hiroshi Hosokawa, Matsuyama (JP)

(73) Assignee: Miura Co., Ltd., Matsuyama-shi (JP)

( * ) Notice: Subject to any disclaimer, the term of this patent is extended or adjusted under 35 U.S.C. 154(b) by 465 days.

(21) Appl. No.: 13/119,348

(22) PCT Filed: May 10, 2010

(86) PCT No.: PCT/JP2010/003179
§ 371 (c)(1),
(2), (4) Date: Mar. 16, 2011

(87) PCT Pub. No.: WO2011/141953
PCT Pub. Date: Nov. 17, 2011

(65) Prior Publication Data
US 2011/0272360 A1    Nov. 10, 2011

(51) Int. Cl.
*C02F 1/42* (2006.01)
*C02F 1/00* (2006.01)
*C02F 1/44* (2006.01)

(52) U.S. Cl.
CPC .............. *C02F 1/42* (2013.01); *C02F 2001/425* (2013.01); *C02F 2301/02* (2013.01); *C02F 1/008* (2013.01); *C02F 2303/16* (2013.01); *C02F 1/441* (2013.01)
USPC .......................................... 210/678; 210/687

(58) Field of Classification Search
CPC .. B01J 49/0008; C02F 1/42; C02F 2001/425; C02F 2303/16; C02F 1/008; C02F 1/441; C02F 2301/02
USPC ........................................................ 210/687
See application file for complete search history.

(56) References Cited

U.S. PATENT DOCUMENTS

| | | | | |
|---|---|---|---|---|
| 3,531,401 A | * | 9/1970 | Crits | 210/677 |
| 4,806,236 A | * | 2/1989 | McCormack | 210/94 |
| 5,464,530 A | * | 11/1995 | Stivers | 210/141 |
| 2007/0227976 A1 | | 10/2007 | Furukawa et al. | |
| 2008/0087606 A1 | * | 4/2008 | Jensen et al. | 210/677 |
| 2008/0264866 A1 | * | 10/2008 | Spriggs et al. | 210/663 |
| 2009/0114583 A1 | | 5/2009 | Yoneda et al. | |

FOREIGN PATENT DOCUMENTS

| | | |
|---|---|---|
| CN | 2172156 Y | 7/1994 |
| JP | 55-84545 | 6/1980 |
| JP | 2007-260574 | 6/1980 |

(Continued)

*Primary Examiner* — Matthew O Savage
(74) *Attorney, Agent, or Firm* — Fox Rothschild LLP

(57) ABSTRACT

A regeneration process in the operating method of the invention includes a first regeneration process, and a second regeneration process after the end of the first regeneration process. In the first regeneration process, a regenerant is distributed at a top of an ion exchange resin bed and simultaneously the regenerant is collected at a bottom of the resin bed, thereby generating a downward flow of the regenerant to regenerate the whole of the resin bed. In the second regeneration process, the regenerant is distributed at a bottom of the ion exchange resin bed and simultaneously the regenerant is collected at a middle of the resin bed, thereby generating an upward flow of the regenerant to regenerate a part of the resin bed.

10 Claims, 17 Drawing Sheets

(56) References Cited

FOREIGN PATENT DOCUMENTS

| | | |
|---|---|---|
| JP | 09-117680 A | 5/1997 |
| JP | 2003-299968 | 10/2003 |
| JP | 2004-167417 | 6/2004 |
| JP | 2008-55392 | 3/2008 |
| WO | 2007-023796 | 3/2007 |

\* cited by examiner

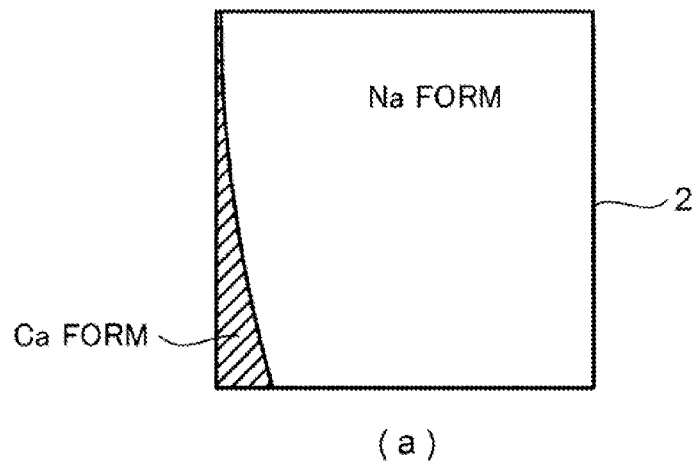
(a)
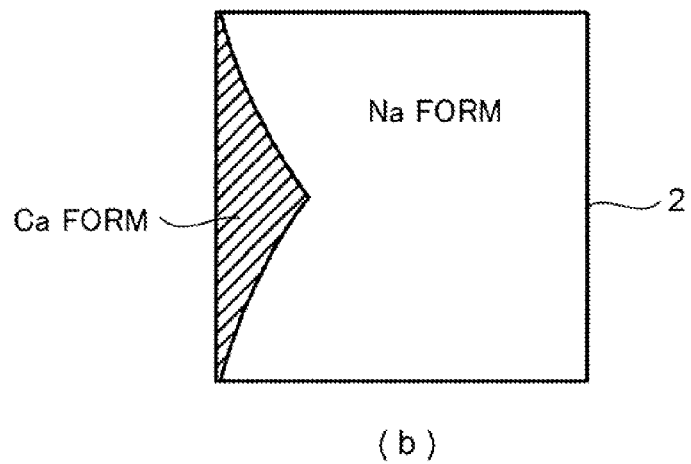
(b)
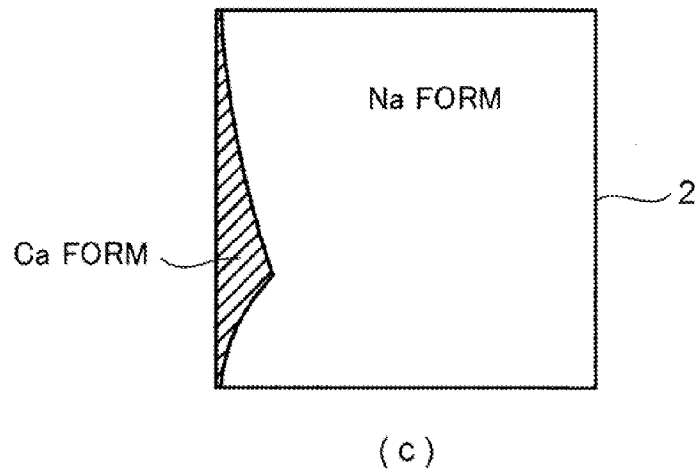
(c)
FIG. 2

|    | S1    | S2    | S3    | S4    | S5    | S6    | S7    | S8    |
|----|-------|-------|-------|-------|-------|-------|-------|-------|
| M1 | OPEN  | CLOSE | CLOSE | CLOSE | CLOSE | CLOSE | OPEN  | CLOSE |
| M2 | OPEN  | CLOSE | CLOSE | CLOSE | CLOSE | CLOSE | CLOSE | CLOSE |
| M3 | CLOSE | OPEN  | CLOSE | CLOSE | CLOSE | CLOSE | CLOSE | CLOSE |
| M4 | CLOSE | OPEN  | CLOSE | CLOSE | CLOSE | CLOSE | CLOSE | CLOSE |
| M5 | CLOSE | CLOSE | OPEN  | CLOSE | OPEN  | CLOSE | CLOSE | CLOSE |
| M6 | CLOSE | CLOSE | OPEN  | OPEN  | CLOSE | CLOSE | CLOSE | OPEN  |
| M7 | CLOSE | CLOSE | CLOSE | CLOSE | OPEN  | OPEN  | CLOSE | CLOSE |
| M8 | CLOSE | CLOSE | CLOSE | CLOSE | OPEN  | OPEN  | CLOSE | CLOSE |
| M9 | CLOSE | CLOSE | OPEN  | OPEN  | CLOSE | CLOSE | OPEN  | CLOSE |

FIG. 10

| DISTRIBUTION PATTERN | REGENERATION LEVELS (g NaCl/L-R) | | | |
|---|---|---|---|---|
| | R | R1 | R2 | R21 |
| P1 | 240 | 207 | 300 | 120 |
| P2 | 180 | 147 | 300 | 120 |
| P3 | 120 | 87 | 300 | 120 |
| P4 | 90 | 66 | 225 | 90 |
| P5 | 60 | 44 | 150 | 60 |

(a)

| DISTRIBUTION PATTERN | REGENERATION LEVELS (eq/L-R) | | | |
|---|---|---|---|---|
| | R | R1 | R2 | R21 |
| P1 | 4.1 | 3.5 | 5.1 | 2.1 |
| P2 | 3.1 | 2.5 | 5.1 | 2.1 |
| P3 | 2.1 | 1.5 | 5.1 | 2.1 |
| P4 | 1.5 | 1.1 | 3.8 | 1.5 |
| P5 | 1.0 | 0.7 | 2.6 | 1.0 |

| DISTRIBUTION PATTERN | REGENERANT DISTRIBUTION RATIOS (%) | |
|---|---|---|
| | U1/U | U2/U |
| P1 | 86 | 14 |
| P2 | 82 | 18 |
| P3 | 73 | 27 |
| P4 | 73 | 27 |
| P5 | 73 | 27 |

FIG. 13

| REGENERATION METHOD | $X_{BTP}$ (gCaCO$_3$/L-R) | $Y_{AVE}$ (mgCaCO$_3$/L) |
|---|---|---|
| TWO-STAGE REGENERATION | 30.2 | 0.3 |
| SPLIT-FLOW REGENERATION | 23.0 | 0.1 |
| CO-CURRENT REGENERATION | --- | --- |

| REGENERATION METHOD | $X_{BTP}$ (gCaCO$_3$/L-R) | $Y_{AVE}$ (mgCaCO$_3$/L) |
|---|---|---|
| TWO-STAGE REGENERATION | 46.5 | 0.6 |
| SPLIT-FLOW REGENERATION | 36.0 | 0.5 |
| CO-CURRENT REGENERATION | --- | --- |

| REGENERATION METHOD | $X_{BTP}$ (gCaCO$_3$/L-R) | $Y_{AVE}$ (mgCaCO$_3$/L) |
|---|---|---|
| EXAMPLE 1 (EXPERIMENTAL EXAMPLE 2) | 46.5 | 0.6 |
| EXAMPLE 2 (EXPERIMENTAL EXAMPLE 3) | 44.3 | 0.6 |

METHOD FOR OPERATING ION EXCHANGE EQUIPMENT

INCORPORATION BY REFERENCE

This application is a 371 of International Application No. PCT/JP2010/003179 filed May 10, 2010, the entire contents of which being hereby incorporated herein by reference.

BACKGROUND OF THE INVENTION

1. Field of the Invention

The present invention relates to a method for operating ion exchange equipment, and ion exchange equipment.

2. Description of Related Art

In water softening apparatuses, which are ordinary ion exchange equipment, co-current regeneration is adopted in many cases since the structure therefor is simple. However, according to co-current regeneration, the level of hardness leak is relatively high in a water treating process (water-softening process); thus, in a boiler or other instruments wherein treated water is used, a scale trouble is easily caused. For this reason, in order to obtain treated water having a high purity, it is necessary to make the regeneration level (use amount of a regenerant per liter of an ion exchange resin) thereof high.

Counter-current regeneration makes it possible to solve a problem of a decrease in the purity of treated water since the regeneration gives a lower hardness leak level than co-current regeneration. However, in order that an apparatus therefor can hold an ion exchange resin bed so as to cause resin beads not to flow in a regeneration process, various complicated techniques are required.

On the other hand, split-flow regeneration disclosed in Patent document 1 (WO 07/23796) and Patent document 2 (JP-A-2008-55392) can solve the problems of co-current regeneration and counter-current regeneration simultaneously. In other words, this method has an advantage that even when the regeneration level is restrained into a low level, treated water having a high purity can be obtained within the range of a practical water collection amount.

In order to solve problems of co-current regeneration and counter-current regeneration, the inventors have been developing water softening apparatus of a split-flow regeneration type. In the process of the development, the inventors have then found out a new problem of split-flow regeneration.

The new problem is caused in a case where with an increase in the size of water softening apparatus the inside diameter of their resin storage tank is increased. In other words, as a ratio of the depth D1 of their ion exchange resin bed to the diameter Z thereof is made smaller, there is caused a phenomenon that a desired water collection amount is not obtained. This phenomenon becomes more remarkable as the ratio of D1/Z is made smaller.

SUMMARY OF THE INVENTION

The inventors have investigated causes therefor, so as to gain the following findings: The flow of a regenerant in split-flow regeneration is produced as represented by an arrow in FIG. 22. As a result, regeneration-insufficiency portions 52 exist in the vicinity of the height of a middle liquid-collecting section 51 in an ion exchange resin bed 50 and at positions apart from the middle liquid-collecting section 51 in the radius direction. In short, the regeneration-insufficiency portions 52 cause a fall in the water collection amount (first finding).

Conventional regenerating methods (co-current regeneration, counter-current regeneration, and split-flow regeneration) are based on a technical common sense that the whole of an ion exchange resin bed is regenerated through a single process. The inventors have been advancing researches on the basis of the first finding so as to break the conventional technical common sense to solve the new problems while retaining the advantage of split-flow regeneration. As a result, the inventors have created a new and useful regeneration process making it possible to increase the water collection amount. The new regeneration process is a process wherein the process to be carried process is switched in the order of co-current regeneration and partial counter-current regeneration so as to perform total regeneration through the two processes. In the partial counter-current regeneration, an ion exchange resin bed region below a middle portion of the bed is regenerated by counter-current flow.

The inventors have advanced further researches about the new regeneration process from the viewpoint that a purpose of the partial counter-current regeneration is to prevent hardness leak in a water treating process. As a result, the inventors have ascertained that sufficient regeneration is necessary for a restricted region of an ion exchange resin bed (hereinafter referred to as a hardness leak prevention bed region). From previous experiences, and additional experiments, the inventors have found out the following: it is sufficient for the hardness leak prevention bed region that the depth thereof is 100 mm or more: and when at least this restricted region is regenerated at a predetermined regeneration level, hardness leak can be prevented (second finding).

Additionally, on the basis of the second finding, it has been made evident that when the proportion of the amount of a regenerant used in the co-current regeneration is increased by the restriction of the proportion in the partial counter-current regeneration, the water collection amount is increased (third finding). It appears that these findings can be applied to ion exchange equipment other than water softening apparatus wherein strong acid cation exchange resin beads are used.

An object of the invention is to attain the following three required items simultaneously:

(1) Treated water is obtained which has a purity equivalent to that of treated water obtained by counter-current regeneration and split-flow regeneration.

(2) Treated water is collected in a larger amount than according to split-flow regeneration while the regeneration level is restrained.

(3) Even when the ratio of the depth of an ion exchange resin bed used in the invention to the diameter thereof is made small, a practical water collection amount is attained.

A first aspect of the invention for attaining the object is a method for operating an ion exchange equipment, which comprises a water treating process of passing raw water in a downward flow form through an ion exchange resin bed having a depth D1 to produce treated water, and a regeneration process of passing a regenerant through the ion exchange resin bed, wherein: the ion exchange resin bed comprises ion exchange resin beads of the same type; the regeneration process comprises a first regeneration process and a second regeneration process performed after the end of the first regeneration process: the first regeneration process is a process of distributing the regenerant to a top of the ion exchange resin bed and simultaneously collecting the regenerant at a bottom of the ion exchange resin bed, thereby generating a downward flow of the regenerant to regenerate the whole of the ion exchange resin bed: and the second regeneration process is a process of distributing the regenerant to the bottom of the ion exchange resin bed and simultaneously collecting the regenerant at a middle of the ion exchange resin bed, thereby generating an upward flow of the regenerant to regenerate a part of the ion exchange resin bed.

According to the first aspect of the invention, treated water can be obtained which has a purity equivalent to that of counter-current regeneration and that of split-flow regeneration. Simultaneously, while a regeneration level used therein is restrained, a larger water collection amount can be obtained than according to split-flow regeneration. Additionally, even when the ratio of the depth of the ion exchange resin bed to the diameter thereof is made small, a practical water collection amount can be obtained.

A second aspect of the invention is the ion exchange equipment operating method according to the first aspect wherein: the second regeneration process is a process of distributing the regenerant to the bottom of the ion exchange resin bed and simultaneously collecting the regenerant at the middle of the exchange resin bed, thereby generating the upward flow of the regenerant to regenerate the part of the ion exchange resin bed; and further distributing the regenerant to the top of the ion exchange resin bed and simultaneously the collecting the regenerant at the middle of the ion exchange resin bed, thereby generating a downward flow of the regenerant to regenerate the other part of the ion exchange resin bed.

According to the second aspect of the invention, the advantageous effects of the first aspect are produced, and further any technique of split-flow regeneration can be used as it is.

A third aspect of the invention is the ion exchange equipment operating method according to the first or second aspect wherein: the ion exchange equipment is a water softening apparatus; the ion exchange resin bed comprises strong acid cation exchange resin beads; in the ion exchange resin bed having a depth $D1$ of 300 to 1500 mm, a hardness leak prevention bed region having a depth $D2$ of 100 mm is set on a premise that the base of the depths thereof is the bottom; the second regeneration process is a process of passing the regenerant through the hardness leak prevention bed region in a regenerant amount $U2$ which gives a regeneration level $R2$ of 1.0 to 6.0 eq/L-R (equivalent per liter resin) to the hardness leak prevention bed region; and the regeneration level $R2$ is a level at which in the water treating process after the second regeneration process, soft water can be produced to have a hardness leak quantity $Y$ of 1 mg $CaCO_3$/L or less by effect of the hardness leak prevention bed region.

According to the third aspect of the invention, the advantageous effects of the first or second aspect are produced, and further in the hardness leak prevention bed region the regenerating agent is prevented from being consumed in an amount than required.

A fourth aspect of the invention is the ion exchange equipment operating method according to the third aspect wherein a position for the collection of the regenerant in the second regeneration process has a depth $D3$ which is set into the range of $D2$ to $0.8 \times D1$ on a premise that the base of the depths is the bottom of the ion exchange resin bed.

According to the fourth aspect of the invention, the advantageous effects of the third aspect are produced, and further in the ion exchange resin bed regenerated through the first regeneration process, the quantity of contamination based on the re-adsorption of hardness components eliminated from the hardness leak prevention bed region during the performance of the second regeneration process can be decreased.

A fifth aspect of the invention is the ion exchange equipment operating method according to the first or second aspect wherein: the ion exchange equipment is a water softening apparatus: the ion exchange resin bed comprises strong acid cation exchange resin beads: after the first regeneration process, a first displacement process is performed wherein the raw water is distributed to the top of the ion exchange resin bed and simultaneously the raw water is collected at the bottom of the ion exchange resin bed, thereby generating a downward flow of the raw water to displace the introduced regenerant; and after the second regeneration process, a second displacement process is performed wherein the raw water is distributed to the bottom of the ion exchange resin bed and simultaneously the raw water is collected at the middle of the ion exchange resin bed, thereby generating an upward flow of the raw water to displace the introduced regenerant.

According to the fifth aspect of the invention, the advantageous effects of the first or second aspect are produced, and further a tank for storing the treated water and a pump for sending the treated water become unnecessary since the raw water is used in the displacement processes. Additionally, the structure of a process-control valve for switching channels of a water softening apparatus can be made simple. Moreover, the displacement processes are performed after the first regeneration process and after the second regeneration process, respectively; thus, hard components eliminated from the ion exchange resin bed during the performance of the first regeneration process can be certainly discharged to the outside of the system. Furthermore, the regenerant distributed in the first regeneration process is caused to pass to the terminal of the ion exchange resin bed, whereby the efficiency of the regeneration can be made high.

A sixth aspect of the invention is the ion exchange equipment operating method according to the fifth aspect wherein: in the second displacement process, as the raw water, use is made of raw water having an electroconductivity of 1500 µS/cm or less and a total hardness of 500 mg $CaCO_3$/L or less; and in the hardness leak prevention bed region, the regenerant is displaced at a displacement volume $N$ of 0.4 to 2.5 BV (bed volume) and a displacement linear velocity $V2$ of 0.7 to 2 m/h.

According to the sixth aspect of the invention, the advantageous effects of the fifth aspect are produced, and further treated water having a high purity can be produced for the following reason: even when the raw water from the bottom of the ion exchange resin bed is used to displace the regenerant, the contamination of the hardness leak prevention bed region is restrained.

A seventh aspect of the invention is an ion exchange equipment, comprising: an ion exchange resin bed comprising ion exchange resin Leads of the same type; a first liquid-distributing section arranged at a top of the ion exchange resin bed; a second liquid-distributing section arranged at a bottom of the ion exchange resin bed: a first liquid-collecting section arranged at the bottom of the ion exchange resin bed;

a second liquid-collecting section at a middle of the ion exchange resin bed: a valve means capable of switching the following flows therebetween: a flow of raw water in a water treating process of distributing the raw water into the first liquid-distributing section and simultaneously collecting the raw water in the first liquid-collecting section, thereby generating a downward flow of the raw water to produce treated water; a flow of a regenerant in a first regeneration process of distributing the regenerant into the first liquid-distributing section and simultaneously collecting the regenerant in the first liquid-collecting section, thereby generating a downward flow of the regenerant to regenerate the whole of the ion exchange resin bed: and a flow of the regenerant in a second regeneration process of distributing the regenerant into the second liquid-distributing section and simultaneously collecting the regenerant in the second liquid-collecting section, thereby generating an upward flow of the regenerant to regenerate a part of the ion exchange resin bed; and a controller that controls the valve means to switch a process to be carried out by the equipment in the order of the water treating process, the first regeneration process and the second regeneration process.

According to the seventh aspect of the invention, treated water can be obtained which has a purity equivalent to that of counter-current regeneration and that of split-flow regeneration. Simultaneously, while a regeneration level used therein is restrained, a larger water collection amount can be obtained than according to split-flow regeneration. Additionally, even when the ratio of the depth of the ion exchange resin bed to the diameter thereof is made small, a practical water collection amount can be obtained.

An eighth aspect of the invention is the ion exchange equipment according to the seventh aspect wherein: the flow of the regenerant in the second regeneration process is a flow for regenerating a part of the ion exchange resin bed by effect of generating an upward flow of the regenerant by distributing the regenerant to the second liquid-distributing section while collecting the regenerant in the second liquid-collecting section; and for regenerating the other part of the ion exchange resin bed by effect of generating a downward flow of the regenerant by distributing the regenerant to the first liquid-distributing section while collecting the regenerant in the second liquid-collecting section.

According to the eighth aspect of the invention, the advantageous effects of the seventh aspect are produced, and further any technique of split-flow regeneration can be used as it is.

A ninth aspect of the invention is the ion exchange equipment according to the seventh or eighth aspect wherein: the ion exchange equipment is a water softening apparatus; the ion exchange resin bed comprises strong acid cation exchange resin beads; in the ion exchange resin bed having a depth D1 of 300 to 1500 mm, a hardness leak prevention bed region having a depth D2 of 100 mm is set on a premise that the base of the depths thereof is the bottom; the second regeneration process is a process of passing the regenerant through the hardness leak prevention bed region in a regenerant amount U2 which gives a regeneration level R2 of 1.0 to 6.0 eq/L-R to the hardness leak prevention bed region: and the regeneration level R2 is a level at which in the water treating process after the second regeneration process, soft water can be produced to have a hardness leak quantity Y of 1 mg $CaCO_3$/L or less by effect of the hardness leak prevention bed region.

According to the ninth aspect of the invention, the advantageous effects of the seventh or eighth aspect are produced, and further in the hardness leak prevention bed region the regenerant is prevented from being consumed in an amount than required.

Advantageous Effects

According to the invention, treated water can be obtained which has a purity equivalent to that of counter-current regeneration and that of split-flow regeneration. Simultaneously, while a regeneration level used therein is restrained, a larger water collection amount can be obtained than according to split-flow regeneration. Additionally, even when the ratio of the depth of the ion exchange resin bed to the diameter thereof is made small, a practical water collection amount can be obtained.

BRIEF DESCRIPTION OF THE DRAWINGS

FIGS. 2(a) to 2(c) are charts showing states of an ion exchange resin bed after regeneration on the basis of a difference between regeneration processes.

FIG. 10 is a chart showing open or close states of valves in each of the processes.

FIGS. 12(a) and (b) are each a chart showing the distribution of a regenerant in the regeneration process (including the first and second regeneration processes).

FIG. 13 is a chart showing the distribution ratio of the regenerating agent in the regeneration process.

DETAILED DESCRIPTION OF THE PREFERRED EMBODIMENT

<Embodiment 1 of the Method for Operating Ion Exchange Equipment>

Figure 1:
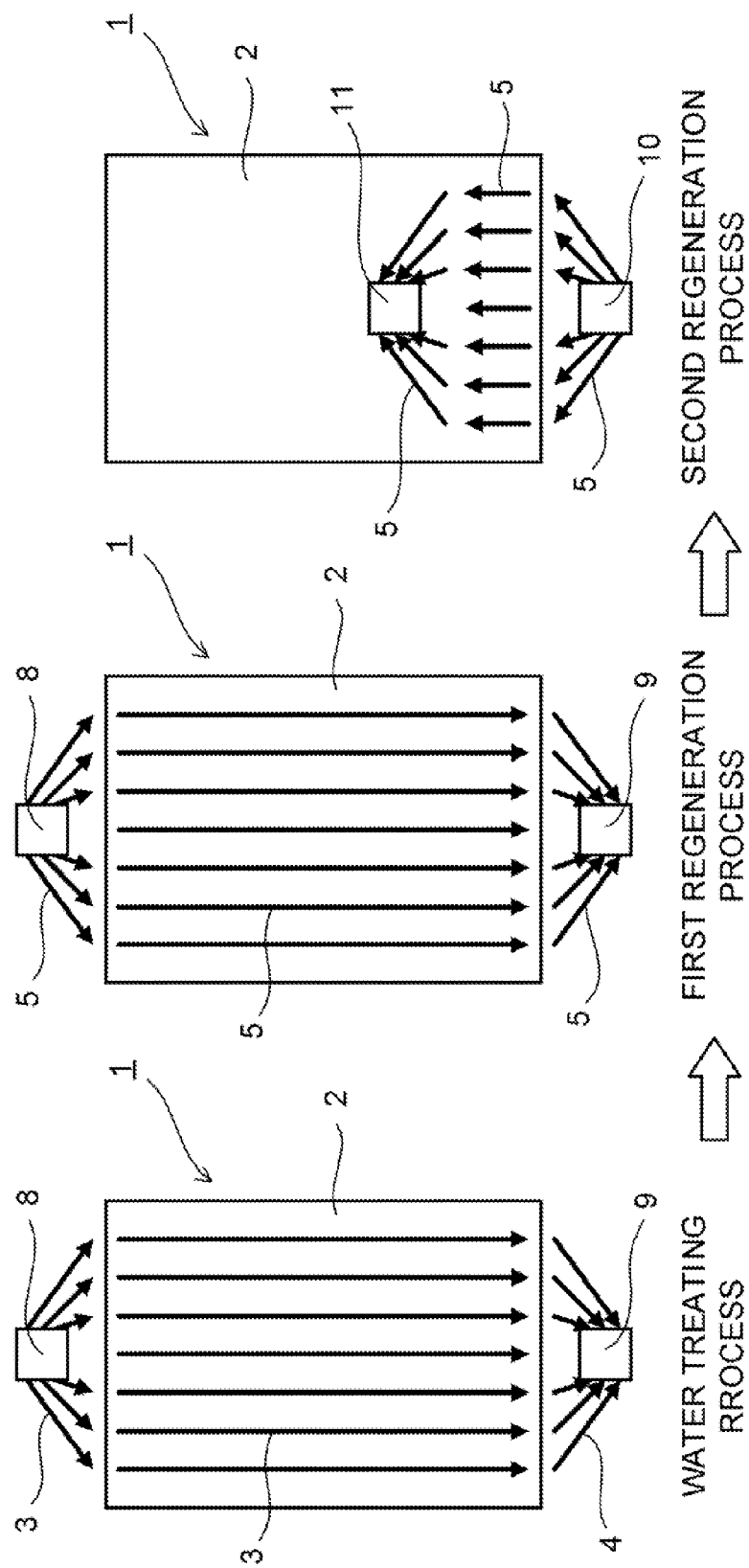
FIG. 1 is a view illustrating a basic process of the operating method of the invention.

A method according to Embodiment 1 for operating ion exchange equipment 1 is described in detail herein. FIG. 1 shows a basic process of the present operating method. The basic process includes a water treating process of passing raw water 3 in a downward flow form through an ion exchange resin bed 2 having a predetermined depth to produce treated water 4; and a regeneration process of passing a regenerant 5 through the ion exchange resin bed 2. In the water treating process, the raw water 3 is distributed into a first liquid-distributing section 8 arranged at the top of the ion exchange resin bed 2 while the treated water 4 is collected at a first liquid-collecting section 9 arranged at the bottom of the ion exchange resin bed 2.

The ion exchange resin bed 2 is made of ion exchange resin beads of the same kind. The same kind means the same in the matrix compositions of the individual resin beads, and in functional groups thereof. The ion exchange resin beads may be selected from an one of two species of cation exchange resin beads and anion exchange resin beads.

The regeneration process includes a first regeneration process and a second regeneration process performed after the end of the first regeneration process. The first regeneration process is a "co-current regeneration process" for regenerating the whole of the ion exchange resin bed 2. In the first regeneration process, the regenerant 5 is distributed into the first liquid-distributing section 8 arranged at the top of the ion exchange resin bed 2, and simultaneously the regenerant 5 is collected at the first liquid-collecting section 9 arranged at the bottom of the ion exchange resin bed 2 to generate a downward flow of the regenerant 5. The second regeneration process is a "partial counter-current regeneration process" for regenerating a part of the ion exchange resin bed 2. In the second regeneration process, the regenerant 5 is distributed into a second liquid-distributing section 10 arranged at the bottom of the ion exchange resin bed 2, and simultaneously the regenerant 5 is collected at a second liquid-collecting section 11 arranged at the middle of the ion exchange resin bed 2 to generate an upward flow of the regenerant agent 5.

According to the present operating method, the whole of the ion exchange resin bed 2 is regenerated in the first regeneration process (co-current regeneration process). In the second regeneration process (partial counter-current regeneration process), an ion exchange resin bed region below the middle liquid-collecting position (hereinafter referred to as a resin bed lower region) is regenerated. The middle liquid-collecting position is precisely defined as the lower end of the lowest hole out of outflow holes made in the second liquid-collecting section 11.

The co-current regeneration process and the partial counter-current regeneration process are each known; however, the present operating method is characterized in that these processes are continuously performed. That is to say, the co-current regeneration process is performed as a first regeneration process, and after the first regeneration process the partial counter-current regeneration process is performed as a second regeneration process. In other words, the present operating method is a process wherein a one-stage regeneration process that has been hitherto performed is improved to a two-stage regeneration process. This is illustrated in FIG. 1.

As described above, known co-current regeneration, counter-current regeneration and split-flow regeneration are each based on a technical common sense (or idea) of regenerating the whole of the ion exchange resin bed 2 basically through a single regeneration process. It is not an ordinary idea that any one of the regeneration-methods in the prior art is converted to a different regeneration method since it is expected that the period required for the regeneration process becomes long or a valve mechanism for channel-switch becomes complicated. In light of the matter that split-flow regeneration solves the problems of co-current regeneration and counter-current regeneration, it can be mentioned that there has not been hitherto any incentive for breaking the technical common sense. As described above, however, the inventors have found out a new problem of split-flow regeneration. This new problem has been overcome by breaking the technical common sense and creating the two-stage regeneration process, which is a feature of the present operating method, on the basis of the first finding.

Figure 22:
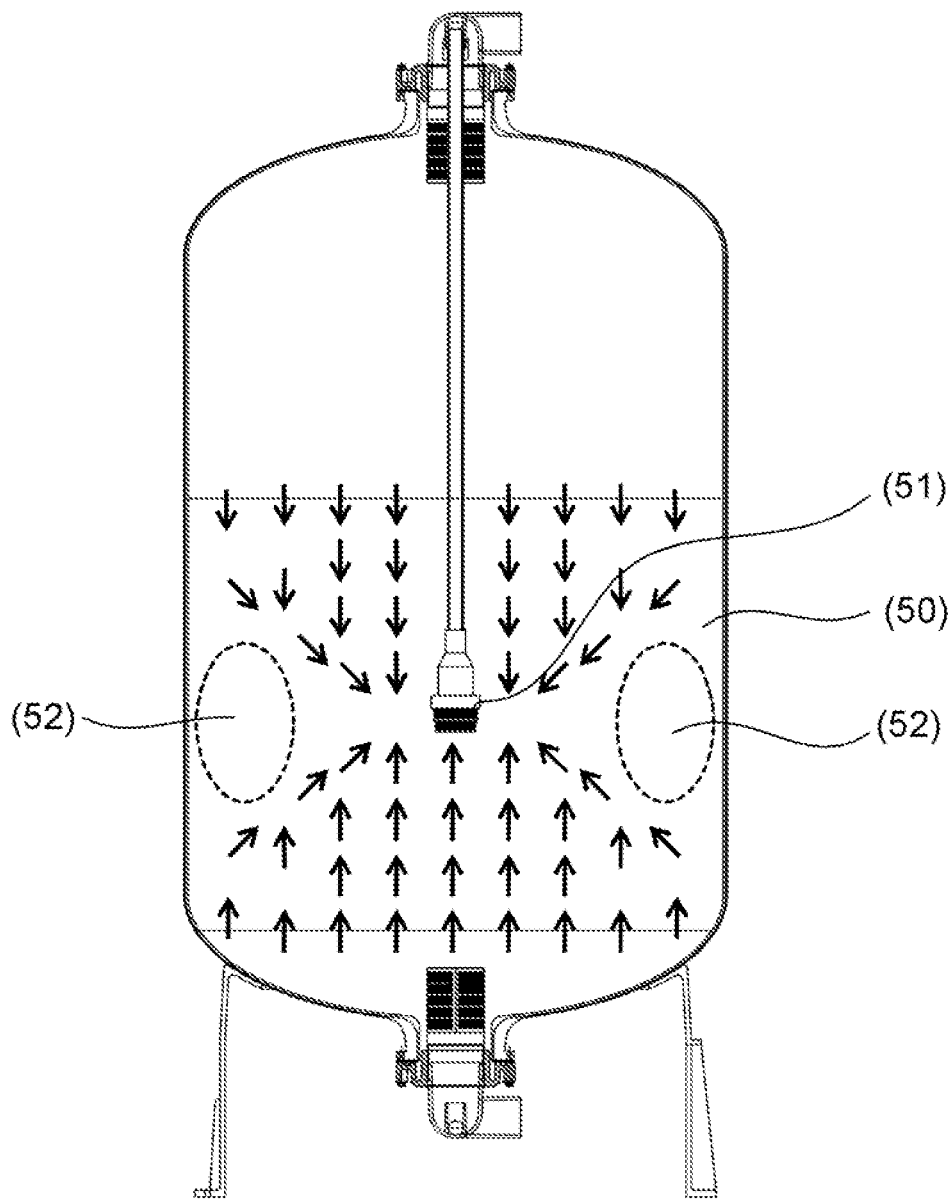
FIG. 22 is a view illustrating the flow of a regenerant in a split-flow regeneration process in the prior art.

With reference to FIG. 2, a description is made about a difference between any one-stage regeneration process and the two-stage regeneration process. FIG. 2 are each a view which qualitatively and schematically shows a regeneration state of an ion exchange resin bed 2 in a water softening apparatus. The upside of the paper corresponds to the upper side of the ion exchange resin bed 2 and the downside thereof corresponds to the lower side of the ion exchange resin bed 2. In FIG. 2, hatched regions are each a region where Ca form cation exchange resin beads that have not yet been regenerated are distributed. Non-hatched regions therein are each a region where Na form cation exchange resin beads that have been regenerated are distributed. The distributions of the Ca form cation exchange resin beads in co-current regeneration and split-flow regeneration in the prior art are shown by FIG. 2(*a*) and FIG. 2(*b*), respectively. In particular, in the split-flow regeneration, regeneration-insufficiency portions (as represented by reference 22 in FIG. 22) exist, whereby the area occupied by the Ca form cation exchange resin beads is large.

Against the above, the distribution of the Ca form cation exchange resin beads according to the two-stage regeneration of the present operating method is shown by FIG. 2(*c*). The ratio of the area occupied by the Ca form cation exchange resin beads to the whole of the ion exchange resin bed 2 is small; this matter means that the water collection amount of treated water (soft water) is increased in the water treating process after the regeneration process. Moreover, in the bottom region of the ion exchange resin bed 2, the ratio of the area occupied by the Ca form cation exchange resin beads thereto is small; this matter means that in the water treating process, the hardness leak level is low so that the purity of the treated water is high.

As is evident from the above description, according to the present operating method, the regeneration-insufficiency portions are decreased to make it possible to gain a water collection amount which is larger than according to split-flow regeneration but is slightly smaller than according to co-current regeneration. Simultaneously, according to the present operating method, the purity of treated water can be certainly kept equivalent to that of treated water according to split-flow regeneration. Furthermore, the present operating method can make use of techniques of known co-current regeneration and partial counter-current regeneration as they are: therefore, the method produces a subsidiary effect that costs for developing ion exchange equipment can be decreased. This subsidiary effect is not essential. Thus, of course, it is allowable to modify techniques of known co-current regeneration and partial counter-current regeneration.

Figure 3:
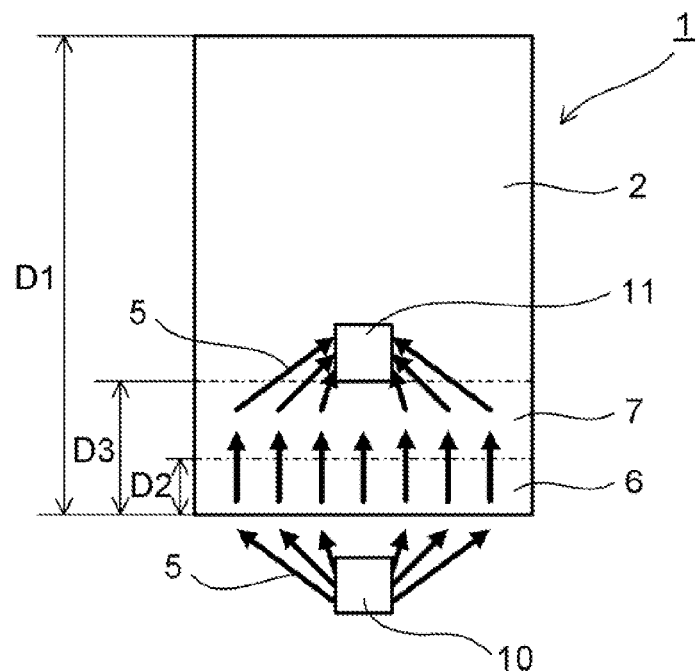
FIG. 3 is a view showing a relationship between the depth D1 of an ion exchange resin bed, the depth D2 of a hardness leak prevention bed region, and the depth D3 of a middle liquid-collecting section.

Preferred Example 1 of the Method for Operating Ion Exchange Equipment:

The operating method according to Embodiment 1 includes Preferred Examples 1 to 4. In Preferred Example 1, the ion exchange equipment 1 is rendered a water softening apparatus, and further the ion exchange resin bed 2 is made of strong acid cation exchange resin beads. As illustrated in FIG. 3, on the basis of the second finding, in the ion exchange resin bed 2 having a depth D1 of 300 to 1500 mm, a hardness leak prevention bed region 6 is set to have a depth D2 of 100 mm on a premise that the base of the depths is the bottom.

In the second regeneration process, the regenerant is passed through the hardness leak prevention bed region 6 in a regenerant amount U2 which gives a regeneration level R2 of 1.0 to 6.0 eq/L-R to the hardness leak prevention bed region 6. The regeneration level R2 is a level at which in the water treating process (water-softening process) after the second regeneration process, soft water can be produced to have a hardness leak quantity Y of 1 mg $CaCO_3$/L or less by effect of the hardness leak prevention bed region 6. When sodium chloride (molecular weight: 58.5) is used as the regenerant, the range of the regeneration level R2 corresponds to the range of 59 to 351 g NaCl/L-R.

The hardness leak prevention bed region 6 may be a region occupying a bottom region of a resin bed lower region 7 having a depth D3. In the resin bed lower region 7, the hardness leak prevention bed region 6 and the other region are not visually distinguished from each other. The boundary therebetween is an imaginary boundary. The hardness leak prevention bed region 6 has a function of ensuring a required purity of soft water.

The reason why the depth D1 of the ion exchange resin bed 2 is set into the range of 300 to 1500 mm is as follows: A description is first made about the lower limit thereof. If the depth D1 of the ion exchange resin bed 2 is extremely low, a drift current of the regenerant or a short pass thereof is easily generated so that the regeneration efficiency unfavorably lowers. When the length of a bed region where ion exchange reaction is caused (ion exchange band) becomes large, an effectively usable portion of the ion exchange resin bed 2 becomes small so that the ion exchange capacity (breakthrough exchange capacity) becomes small. Therefore, according to a design of the water softening apparatus wherein the volume of the ion exchange resin bed 2 is more than 20 L, it is recommendable that the depth thereof is 800 mm or more. However, in a case where the water softening apparatus is, in particular, an apparatus having a small volume, the apparatus can be put into practical use when the apparatus keeps a depth of 300 mm or more certainly. Thus, the lower limit is set to 300 mm. Next, a description is made about the upper limit. The upper limit is essentially unnecessary. However, if the depth D1 of the ion exchange resin bed 2 is too large, a pressure loss increases at the time of passing raw water through the apparatus or the height of the apparatus becomes large so that a problem about transportation is caused. In light of such a situation, it is unlikely that a water softening apparatus wherein its ion exchange resin bed 2 has a depth of 1500 mm or more is produced. Thus, the upper limit is set to 1500 mm.

The reason why the depth D2 of the hardness leak prevention bed region 6 is set to 100 mm is based on the second finding, and is as follows: The water softening apparatus first has the following presuppositions: the depth D1 of the ion exchange resin bed 2 is set into the range of 300 to 1500 mm; in the second regeneration process, the regenerant is passed through the hardness leak prevention bed region 6 in a regenerant amount U2 which gives a regeneration level R2 of 1.0 to 6.0 eq/L-R to the hardness leak prevention bed region; and in the water treating process after the second regeneration process, the regeneration level R2 is set into a level at which the hardness leak prevention bed region 6 makes it possible to produce soft water having a hardness leak quantity of 1 mg $CaCO_3$/L or less. On the presuppositions, the depth D2 is kept into at least 100 mm in order to remove about 99% of hardness components contained in the raw water by effect of the ion exchange resin bed 2 from which the hardness leak prevention bed region 6 is excluded and further remove the rest thereof, the percentage of which is 1%, by effect of the hardness leak prevention bed region 6.

The reason why the regeneration level R2 is set into the range of 1.0 to 6.0 eq/L-R is as follows: In a graph of the regeneration-level-to-regeneration-ratio property wherein the regeneration level (eq/L-R) is taken on the transverse axis and the regeneration ratio (%) is taken on the vertical axis, the regenerant amount is small when the regeneration level is the lower limit (1.0 eq/L-R) or less. In this case, the regeneration is instable. The upper limit (6.0 eq/L-R) is a value decided from the viewpoint of practicability and economy. The regeneration level R2 is more preferably set into the range of 2.6 to 5.1 eq/L-R. This range is an experimentally ascertained range. As detailed in Example 1, which will be described later, in a case where the more preferred regeneration level R2 is converted to the regeneration level R21 for the resin bed lower region 7 when the depth D3 of the region 7 is 250 mm, the R21 is from 1.0 to 2.1 eq/L-R.

In Preferred Example 1, through the regeneration process of the water softening apparatus, the regenerant is passed through the ion exchange resin bed 2 in a total regenerant amount U which permits the total regeneration level R to be from 1.0 to 4.1 eq/L-R. Specifically, in the first regeneration process, the regenerant is passed through the whole of the ion exchange resin bed 2 in a remaining-regenerant amount U1 obtained by subtracting, from the total regenerant amount U, the regenerant amount U2 (the regenerant amount calculated from the regeneration level R2). In the second regeneration process, the regenerant is passed through the hardness leak prevention bed region 6 in the regenerant amount U2. In other words, the total regeneration level R is defined as the overall regeneration level over the whole of the first regeneration process and the second regeneration process.

Preferred Example 2 of the Method for Operating Ion Exchange Equipment:

The apparatus in Preferred Example 1 is preferably formed as follows in Preferred Example 2: The depth D3 of the liquid-collection position for the second regeneration process is set into the range of D2 to 0.8×D1 on a premise that the base of the depths is the bottom of the ion exchange resin bed 2. The depth D3 is more preferably set into the range of D2 to 0.5×D1.

Unless the height of the middle liquid-collection position is equal to or larger than the depth D2 of the hardness leak prevention bed region 6, the regeneration of the hardness leak prevention bed region 6 is not sufficiently attained: thus, the lower limit of the depth D3 is set to a value equal to the depth D2. The upper limit of the depth D3 is set to 0.8×D1 in order to prevent the contamination and fluidization of the ion exchange resin bed 2. If the depth D3 of the liquid-collection position, the base of which is the bottom, becomes large, the ion exchange resin bed 2 is easily contaminated by regenerated waste liquid containing high-concentration Ca ions generated in the second regeneration process. In other words, it is feared that hardness components are again adsorbed onto the ion exchange resin bed 2 regenerated through the first regeneration process, whereby the water collection amount is declined. If the depth D3 of the liquid-collection position, the base of which is the bottom, becomes large, the resin bed lower region 7 is easily fluidized by the flow of the regenerant in the second regeneration process. In other words, when the ratio of the resin bed upper region to the resin bed lower region 7 is small so that downward pushing/pressing force is small, it is feared that the resin beads float so that the period for the contact between the beads and the regenerant becomes short. For this reason, the upper limit of the depth D3 is set to 0.8×D1 as far as a practical water collection amount can be ensured. In order to prevent the contamination and the fluidization of the ion exchange resin bed 2 certainly to make the water collection amount high, the upper limit of the depth D3 is more preferably set to 0.5×D1. These upper limit examples of the depth D3 have no critical significance, so as to be changeable.

Preferred Example 3 of the Method for Operating Ion Exchange Equipment:

In Preferred Example 1 and Preferred Example 2, operation therefor is preferably made as follows in Preferred Example 3: After the first regeneration process, the raw water 3 is distributed to the top of the ion exchange resin bed 2, and simultaneously the water is collected from the bottom of the ion exchange resin bed 2. In this way, a downward flow of the raw water 3 is generated, so that a first displacement process for displacing the introduced regenerant 5 is performed. Also after the second regeneration process, the raw water 3 is distributed to the bottom of the ion exchange resin bed 2, and simultaneously the water is collected at the middle of the ion exchange resin bed 2. In this way, an upward flow of the raw water 3 is generated, so that a second displacement process for displacing the introduced regenerant 5 is performed.

In Preferred Example 3, by performing the first displacement process, the regenerant amount U1 used in the first regeneration process is passed through the ion exchange resin bed 2 to the terminal thereof without any waste, and further hardness components eliminated from the resin beads are prevented from being again adsorbed thereon. Therefore, the regeneration efficiency of the first regeneration process can be raised. Before the second regeneration process, the hardness components eliminated in the first regeneration process are discharged from the hardness leak prevention bed region 6 to the outside of the system; thus, the regeneration efficiency of the second regeneration process can be raised.

In the first and second displacement processes, the treated water (soft water) is not used as the displacing water. Thus, when compared with conventional water softening apparatus, wherein treated water is used in a displacement process, the present apparatus makes it unnecessary to use any tank for storing the treated water nor any pump for sending the treated water. Additionally, the present example has an advantage of making it possible to simplify the structure of a process-controlling valve for switching channels in the water softening apparatus.

Preferred Embodiment 4 of the Method for Operating Ion Exchange Equipment:

In order that soft water having a high purity can be obtained even when raw water is used to perform the displacement processes in Preferred Example 3, operation therefor is preferably made as follows in Preferred Example 4: In the second displacement process, use is made of raw water having an electroconductivity of 1500 μS/cm or less and a total hardness H of 500 mg $CaCO_3$/L. Furthermore, for the hardness leak prevention bed region 6, the displacement volume N of the raw water (displacing water) is set into the range of 0.4 to 2.5 BV (bed volume), and the displacement linear velocity V2 of the raw water is set into the range of 0.7 to 2 m/h. Preferred Example 4 is an example wherein conditions for the second displacement process (hereinafter referred to merely as the "displacement conditions") are specified for the hardness leak prevention bed region 6. The displacement conditions are described in detail hereinafter.

In a case where raw water (hard water) is used as the displacing water in the second displacement process, ion exchange is performed in the vicinity of the lower end of the hardness leak prevention bed region 6 when the displacement volume N is too large. The ion exchange causes the adsorption of the hardness components (Ca ions and Mg ions). As a result, in the subsequent water treating process, Na ions or K ions released into the water by the ion exchange of the hard water cause the elimination of the hardness components adsorbed in the vicinity of the lower end of the hardness leak prevention bed region 6, so that the hardness leak level of the soft water is unfavorably increased. In order to solve this problem in Preferred Example 4, the displacement volume N and the displacement linear velocity V2 when raw water having a predetermined water quality is used are limited. The displacement volume N and the displacement linear velocity V2 are decided in three steps described below.

In step 1, given are various conditions including the depth D2 of the hardness leak prevention bed region, the electroconductivity K of the raw water, the total hardness H of the raw water, the total regeneration level R, the regenerant concentration C, the hardness removing capacity X required in the water treating process, and the hardness leak quantity Y of soft water to be obtained. With reference to Preferred Example 1, the depth D2 of the hardness leak prevention bed region 6 is set to at least 100 mm in the ion exchange resin bed 2 having a depth D1 of 300 to 1500 mm. The electroconductivity K of the raw water is set into 1500 μS/cm or less in order that this numerical value can cover the electroconductivity of most of natural water species having a continental water quality (quality of water in, for example, the Chinese continent or the North American continent). The total hardness H of the raw water is set to 500 mg $CaCO_3$/L or less for the same purpose about the electroconductivity. With reference to Preferred Example 1, the total regeneration level R is set into the range of 1.0 to 4.1 eq/L-R (60 to 240 g NaCl/L-R). The regenerant concentration C is set to the range of 5 to 15% by weight, the range being adopted in standard water softening apparatus. The hardness removing capacity X is set into the range of 30 to 60 g $CaCO_3$/L-R in order that the present apparatus can ensure a water collection amount equivalent to that ensured by each water softening apparatus of a co-current regeneration type. This range corresponds to a case where the total regeneration level R is from 1.0 to 4.1 eq/L-R. The hardness leak quantity Y is set to 1 mg $CaCO_3$/L or less on the assumption that the resultant soft water is supplied to a boiler system or a reverse osmotic membrane system.

Figure 4:
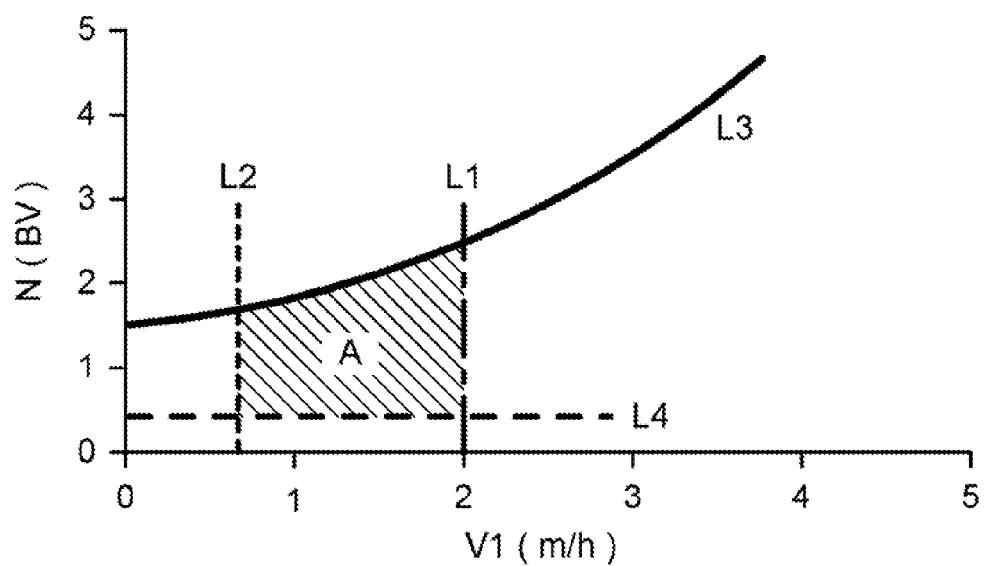
FIG. 4 is a graph showing appropriate range of the regeneration linear velocity V1, and the displacement volume N in a second displacement process.

In step 2, use is made of the fact that the hardness removing capacity X is concerned with the regeneration level R and the regeneration linear velocity V1 to set a value of the regeneration linear velocity V1 giving the desired value of the hardness removing capacity X. In other words, the regeneration linear velocity V1 is decided by the hardness removing capacity X value set previously. However, the upper limit and the lower limit thereof are specified for the following reason: A description is first made about the upper limit. In the second regeneration process (partial counter-current regeneration process), the period when the ion exchange resin bed 2 contacts the regenerant 5 tends to become shorter than in the first regeneration process (co-current regeneration process). It is therefore necessary to restrict the upper limit of the regeneration linear velocity V1 to extend the contacting period, thereby promoting the regeneration. Thus, in order that the present apparatus can ensure a hardness removing quantity X value (for example, 43 g $CaCO_3$/L-R) equivalent to that ensured by each water softening apparatus of a co-current regeneration type, the regeneration linear velocity V1 is preferably set to 2 m/h or less. This upper limit is represented by a line L1 in FIG. 4. The left-side area of the line L1 shows an area of the regeneration linear velocity V1 wherein the hardness removing capacity X is a required quantity or more. In contrast, the right-side area of the line L1 shows an area of the regeneration linear velocity V1 wherein the hardness removing capacity X is less than the required quantity. Next, a description is made about the lower limit. If the regeneration linear velocity V1 is less than 0.7 m/h, a drift current of the regenerant 5 or a short pass thereof is easily generated in the ion exchange resin bed 2. This lower limit is represented by a line L2 in FIG. 4. In the left-side area of the line L2, the regeneration easily gets insufficient. Thus, it is feared that in the water treating process, the ion exchange resin bed 2 is broken in a short time. Accordingly, the regeneration linear velocity V1 is set into the range of 0.7 to 2 m/h, which corresponds to the area between the lines L1 and L2.

In step 3, the displacement linear velocity V2 and the displacement volume N are set to make the hardness leak quantity Y of the soft water into a required quantity or less. Since the displacement linear velocity V2 has a specific correlation with the regeneration linear velocity V1, the displacement linear velocity V2 can be approximated to the regeneration linear velocity V1. For the purpose thereof, with reference to the regeneration linear velocity V1 value set in step 2, the displacement linear velocity V2 is set into the range of 0.7 to 2 m/h. Next, a condition that the regeneration linear velocity V1 is from 0.7 to 2 m/h is imposed. In this case, the upper limit of the displacement volume N for making the hardness leak quantity Y into the required quantity or less can be obtained. This upper limit is represented by a line L3 in FIG. 4. Thus, the maximum value of the displacement volume N is 2.5 BV, which corresponds to the intersection of the lines L1 and L3. In the meantime, the lower limit of the displacement volume N is set to 0.4 BV, which corresponds to the porosity of the hardness leak prevention bed region 2. This lower limit is represented by a line L4 in FIG. 4. In the area below the line L4, the displacement volume N is extremely small, so that the period for the contact between the ion exchange resin bed 2 and the regenerant 5 becomes insufficient. Thus, the regeneration efficiency is declined. Moreover, the regenerant 5 remains in the ion exchange resin bed 2. As a result, in the water treating process, the regenerant 5 may flow into the subsequent (or following) devices so that the devices may be corroded, broken, or troubled. Accordingly, the displacement volume N is set into the range of 0.4 to 2.5 BV, which corresponds to the area between the lines L3 and L4.

From the above, an appropriate scope of the displacement linear velocity V2 (corresponding to the regeneration linear velocity V1) and the displacement volume N is an area A surrounded by the lines L1 to L4. In other words, the scope specified by the area A corresponds to displacement conditions of Preferred Example 4. According to the displacement conditions of Preferred Example 4, soft water having a hardness leak quantity Y of 1 mg $CaCO_3$/L or less can be produced even in the case of using raw water having an electroconductivity K of 1500 μS/cm or less and a total hardness H of 500 mg $CaCO_3$/L or less.

<Embodiment 1 of Ion Exchanger>

Present Embodiment 1 is ion exchange equipment for realizing above-mentioned Embodiment 1 of the operating method. The apparatus is described, referring not to the above description but to FIG. 1 again. Ion exchange equipment 1, as this exchanger, is ion exchange equipment wherein a regenerant 5 is passed through an ion exchange resin bed 2 made of ion exchange resin beads of the same kind to regenerate the bed 2. The ion exchange equipment 1 has an ion exchange resin bed 2; a first liquid-distributing section 8 arranged at the top of the ion exchange resin bed 2; a second liquid-distributing section 10 arranged at the bottom of the ion exchange resin bed 2; a first liquid-collecting section 9 arranged at the bottom of the ion exchange resin bed 2; a second liquid-collecting section arranged at the middle of the ion exchange resin bed 2; and a valve means.

The valve means is formed in such a manner that at least the following flows can be switched therebetween:

(a) the flow of fluid in a water treating process in which raw water 3 is distributed into the first liquid-distributing section 8 and simultaneously the flowing water is collected in the first liquid-collecting section 9, thereby generating a downward flow of the raw water 3 to produce treated water 4;

(b) the flow of fluid in a first regeneration process in which the regenerant 5 is distributed into the first liquid-distributing section 8 and simultaneously the regenerant 5 is collected in the first liquid-collecting section 9, thereby generating a downward flow of the regenerant 5 to regenerate the whole of the ion exchange resin bed 2; and (c) the flow of fluid in a second regeneration process in which the regenerant 5 is distributed into the second liquid-distributing section 10 and simultaneously the regenerant 5 is collected in the second liquid-collecting section 11, thereby generating an upward flow of the regenerant 5 to regenerate a resin bed lower region 7.

The ion exchange equipment 1 further has a controller for controlling the valve means to switch the process to be carried process in the order of the water treating process, the first regeneration process, and the second regeneration process. The controller makes a control to perform the first regeneration process, and then switch the process into the second regeneration process, thereby performing total regeneration of the ion exchange resin bed 2 at the two stages.

Preferred Example 1 of the Ion Exchange Equipment:

The ion exchange equipment 1 according to Embodiment 1 includes Preferred Examples 1 to 3. Preferred Examples 1 to 3 are each a water softening apparatus. In preferred Example 1, a hardness leak prevention bed region 6 having a depth D2 of 100 mm is set into the ion exchange resin bed 2 having a depth D1 of 300 to 1500 mm on a premise that the base of the depths is the bottom. In the second regeneration process thereof, the regenerant 5 is passed through the hardness leak prevention bed region 6 in a regenerant amount U which gives a regeneration level R2 of 1.0 to 6.0 eq/L-R to the hardness leak prevention bed region 6. The regeneration level R2 is a level at which in the water treating process (water-softening process) after the second regeneration process, soft water can be produced to have a hardness leak quantity Y of 1 mg $CaCO_3$/L or less by effect of the hardness leak prevention bed region 6.

Preferred Example 2 of the Ion Exchange Equipment:

The apparatus of Preferred Example 1 is preferably formed as follows in Preferred Example 2: through the regeneration process of the water softening apparatus, the regenerant is passed through the ion exchange resin bed 2 in a total regenerant amount U which permits the total regeneration level R to be from 1.0 to 4.1 eq/L-R. Specifically, in the first regeneration process, the regenerant is passed through the whole of the ion exchange resin bed 2 in a remaining-regenerant amount U1 obtained by subtracting, from the total regenerant amount U, the regenerant amount U2 (the regenerant amount calculated from the regeneration level R2). In the second regeneration process, the regenerant is passed through the hardness leak prevention bed region 6 in the regenerant amount U2.

Preferred Example 3 of the Ion Exchange Equipment:

The apparatus of Preferred Example 2 is preferably formed as follows in Preferred Example 3: The water softening apparatus has a selector capable of selecting the total regeneration level R at will in the range of 1.0 to 4.1 eq/L-R. The selector sets the regeneration level R2 into the range of 1.0 to 6.0 eq/L-R, preferably 2.6 to 5.1 eq/L-R correspondingly to the selected total regeneration level R value. The regeneration level R2 is a set value having a relationship of increasing with an increase in the total regeneration level R. According to Preferred Example 3, in the second regeneration process, the regenerant is not used in an amount more than required even when the total regeneration level R is selected into a high value. Accordingly, the use ratio of the regenerant can be made large in the first regeneration process. Thus, the water collection amount can be increased.

Constituting Elements of the Ion Exchange Equipment:

A description is made about the constituting elements of the ion exchange equipment 1 according to Embodiment 1 (of the operating method or the ion exchange equipment). About the ion exchange resin beads, either cation exchange resin beads or anion exchange resin beads may be selected. The regenerant usable in the water softening apparatus using cation exchange resin beads may be selected from sodium chloride, potassium chloride, sodium hydroxide, potassium hydroxide, and others. The ion exchange resin bed 2 is not limited into any specific structure. For example, the bed 2 may be laminated on a supporting bed made of silica rocks, or an inactive resin. The ion exchange resin bed 2 is arranged in a resin storing tank. The resin storing tank is not limited into any specific shape, structure nor material.

The first liquid-distributing section 8 is preferably formed to have a structure wherein the regenerant 5 is caused to flow from the top of the ion exchange resin bed 2 throughout any cross section of the ion exchange resin bed 2 as uniformly as possible. It is therefore desired that the first liquid-distributing section 8 has a structure wherein the regenerant 5 is dispersed throughout any cross section of the ion exchange resin bed 2. However, when a freeboard is present above the ion exchange resin bed 2 and the regenerant 5 is stored in this space, the regenerant 5 flows substantially uniformly throughout any cross section of the ion exchange resin bed 2. For this reason, the dispersing structure of the first liquid-distributing section 8 is not essential.

The first liquid-collecting section 9 is preferably formed to have a structure wherein from the bottom of the ion exchange resin bed 2 the regenerant 5 is collected as uniformly as possible throughout any cross section of the ion exchange resin bed 2. It is therefore desired that a supporting bed made of silica rocks, or an inactive resin is located below the ion exchange resin bed 2 and the first liquid-collecting section 9 is arranged in the supporting bed. When the resin storing tank is made into a cylindrical form, it is desired that the size (for example, the outside diameter) of the first liquid-collecting section 9 is a size permitting the section 9 to be inserted into an opening made in the lower end or the upper end of the resin storing tank. When the first liquid-collecting section 9 is made small in size, the apparatus can easily be fabricated.

The first liquid-collecting section 9 is preferably used also as the second liquid-distributing section 10. However, the second liquid-distributing section 10 is not limited into this form. In other words, the second liquid-distributing section 10 may be set up separately from the first liquid-collecting section 9.

The second liquid-collecting section 11 is preferably formed to have a structure wherein from the middle of the ion exchange resin bed 2 the regenerant 5 is collected as uniformly as possible throughout any cross section of the ion exchange resin bed 2. Actually, however, it is difficult that the regenerant is collected uniformly at the middle of the ion exchange resin bed 2. Of course, when the second liquid-collecting section 11 is formed into a structure spread in the horizontal direction, the collection can be more uniformly attained. However, in the second liquid-collecting section 11, the position or the number of the holes into which liquid flows actually is limited; thus, a drift current therein cannot be avoided. When the resin storing tank is formed into a cylindrical form, it is desired that the size (for example, the outside diameter) of the second liquid-collecting section 11 is a size permitting the section 11 to be inserted into an opening made in the lower end or the upper end of the resin storing tank. When the second liquid-collecting section 11 is made small in size, the apparatus can easily be fabricated.

The valve means is composed of valves the number of which is proper. The valve means is not limited into any specific structure as far as the means makes it possible to control the flow of fluid in each of the processes in the ion exchange equipment 1.

<Embodiment 2 of the Method for Operating Ion Exchange Equipment and the Ion Exchange Equipment>

Figure 5:
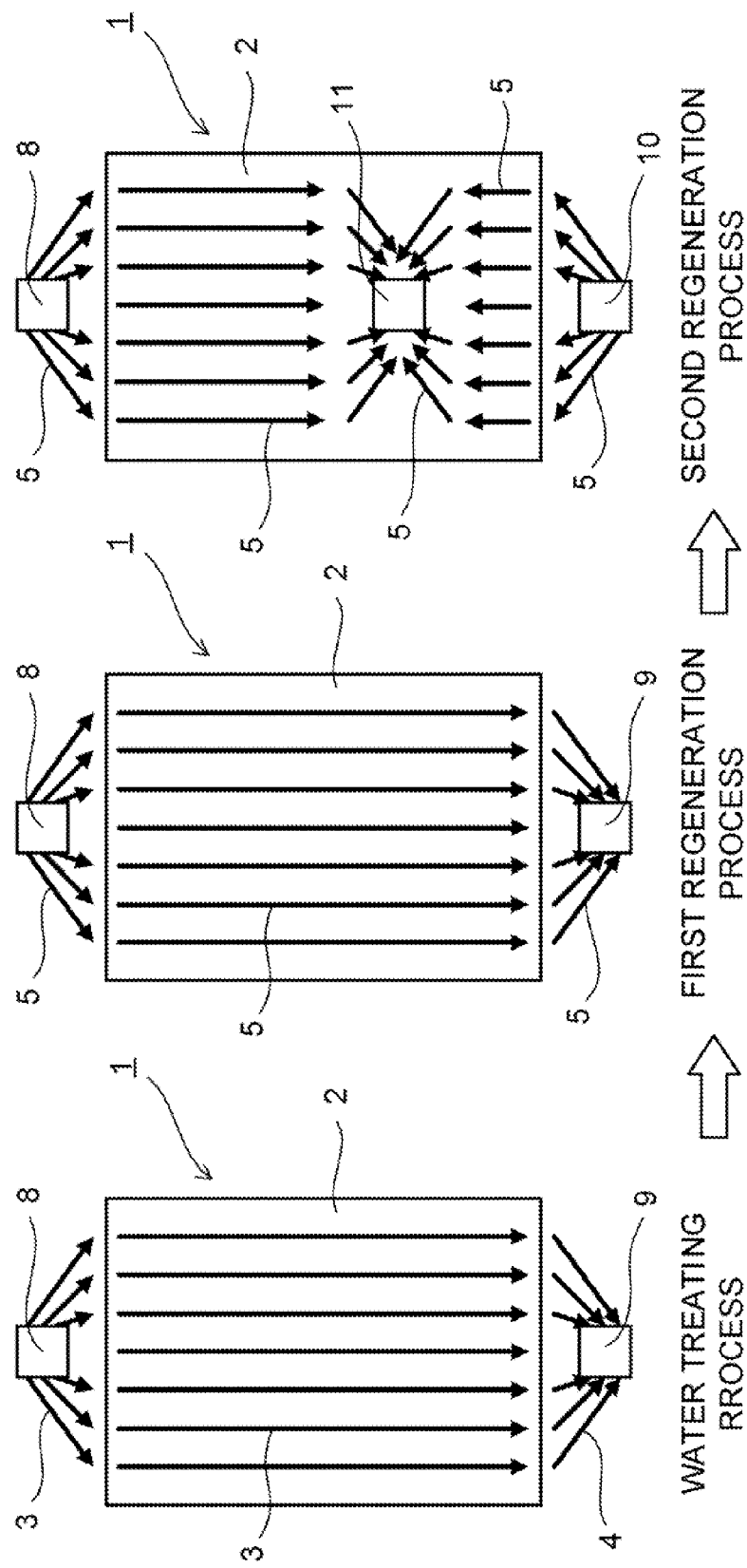
FIG. 5 is a view illustrating a basic process of the operating method of another embodiment of the invention.

The invention is not limited to above-mentioned Embodiment 1, and includes another Embodiment 2. Embodiment 2 is an embodiment wherein the second regeneration process in Embodiment 1 (of the operating method or the ion exchange equipment) is modified. As illustrated in FIG. 5, the second regeneration process in Embodiment 2 has not only the upward flow of the regenerant 5 but also a downward flow thereof caused by distributing the regenerant 5 to the top of the ion exchange resin bed 2 and simultaneously collecting the regenerant 5 at the middle of the bed 2.

In Embodiment 2, the following are simultaneously performed: partial counter-current regeneration of the resin bed lower region 7; and partial co-current regeneration of the resin bed upper region above the second liquid-collecting section 11. The second regeneration process of performing the partial counter-current regeneration and the partial co-current regeneration simultaneously is a technique according to conventional split-flow regeneration. However, Embodiment 2 is essentially different from split-flow regeneration in that the whole is subjected to co-current regeneration in the first regeneration process before the second regeneration process.

In the case where the ion exchange resin bed 2 in Embodiment 2 is made of cation exchange resin beads in the same way as in Embodiment 1, the ion exchange equipment 1 can be rendered a water softening apparatus. In the water softening apparatus, the hardness leak prevention bed region 6 wherein the depth D2 is 100 mm is set in the ion exchange resin bed 2 wherein the depth D1 is from 300 to 1500 mm on a premise that the base of the depths is the bottom. In the second regeneration process, the regenerant is passed through the hardness leak prevention bed region 6 in a regenerant amount U2 which gives a regeneration level R2 of 1.0 to 6.0 eq/L-R to the hardness leak prevention bed region. The regeneration level R2 is a level at which in the water treating process (water-softening process) after the second regeneration process, soft water can be produced to have a hardness leak quantity Y of 1 mg $CaCO_3$/L or less by effect of the hardness leak prevention bed region 6.

In the water softening apparatus, the depth D3 of the liquid-collection position in the second regeneration process is set into the range of D2 to 0.8×D1, preferably D2 to 0.5×D1 on a premise that the base of the depths is the bottom of the ion exchange resin bed 2. Furthermore, about the distribution of the regenerant between the partial counter-current regeneration and the partial co-current regeneration, it is preferred that the regenerant amount in the partial counter-current regeneration is made larger than that in the partial co-current regeneration. However, about the distribution, the two amounts may be made equal to each other.

According to Embodiment 2, any resin storing tank and/or any valve means used in split-flow regeneration may be used as it is or as they are.

EXAMPLE 1

<Structure of Water Softening Apparatus>

Figure 6:
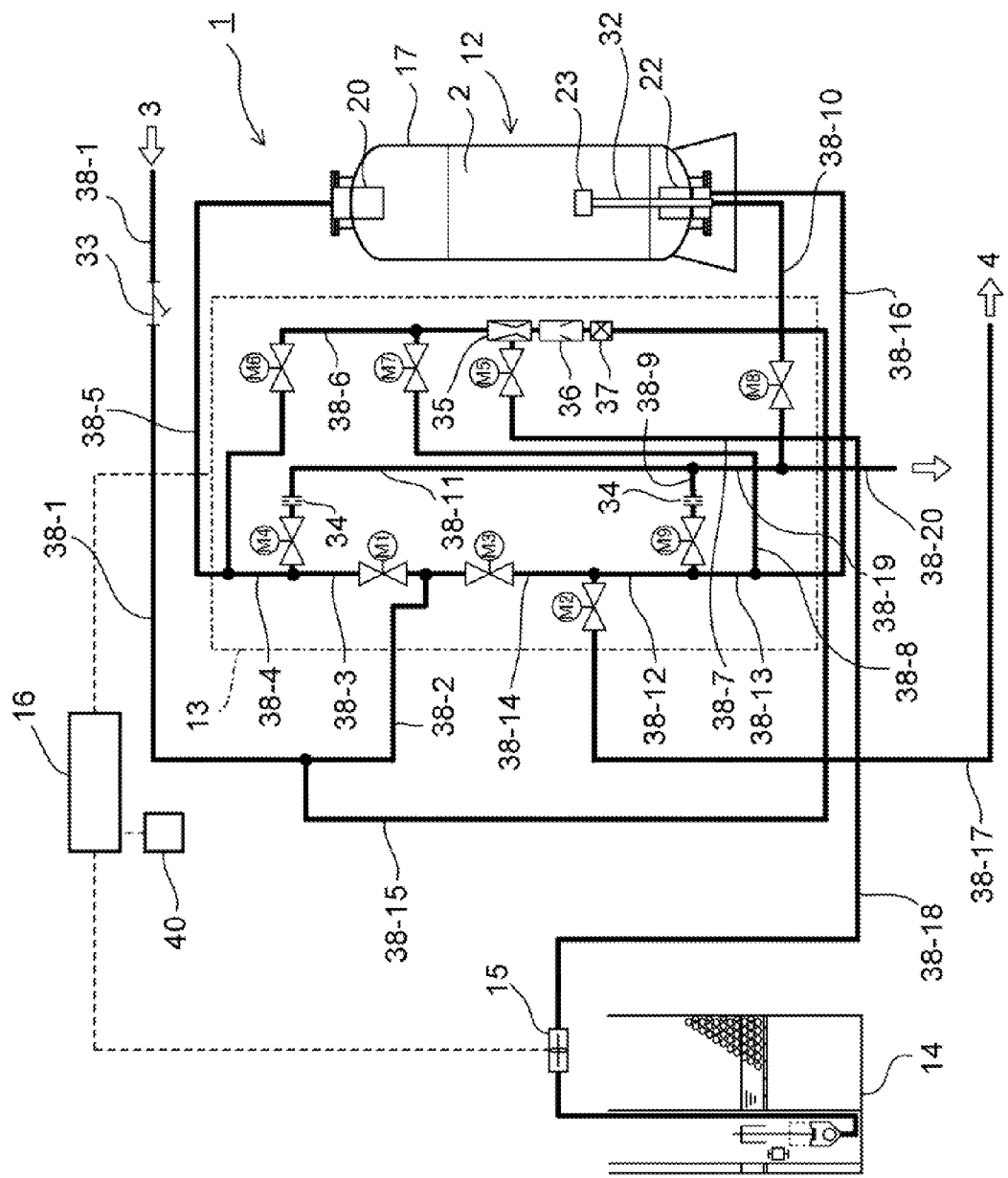
FIG. 6 is a view illustrating the whole of the structure of a water softening apparatus according to Example 1.

FIG. 6 illustrates the structure of the whole of a water softening apparatus according to Example 1. A water softening apparatus 1, as this apparatus, is connected to, for example, a residential building such as a house or a condominium, a custom-drawing facility such as a hotel or a public bath, a cooling or heating apparatus such as a boiler or a cooling tower, or a water-used apparatus such as a food-processing apparatus or a washing apparatus. The water softening apparatus 1 is mainly equipped with a resin storing tank 12: process-controlling valves (hereinafter referred to merely as the "control valves") 13; a salt water supplier 14 for supplying salt water as a regenerant; and a control unit 16 as a controller which receives the input of signals from a salt water flow meter 15 and others, and controls the control valves 13, and others.

Figure 7:
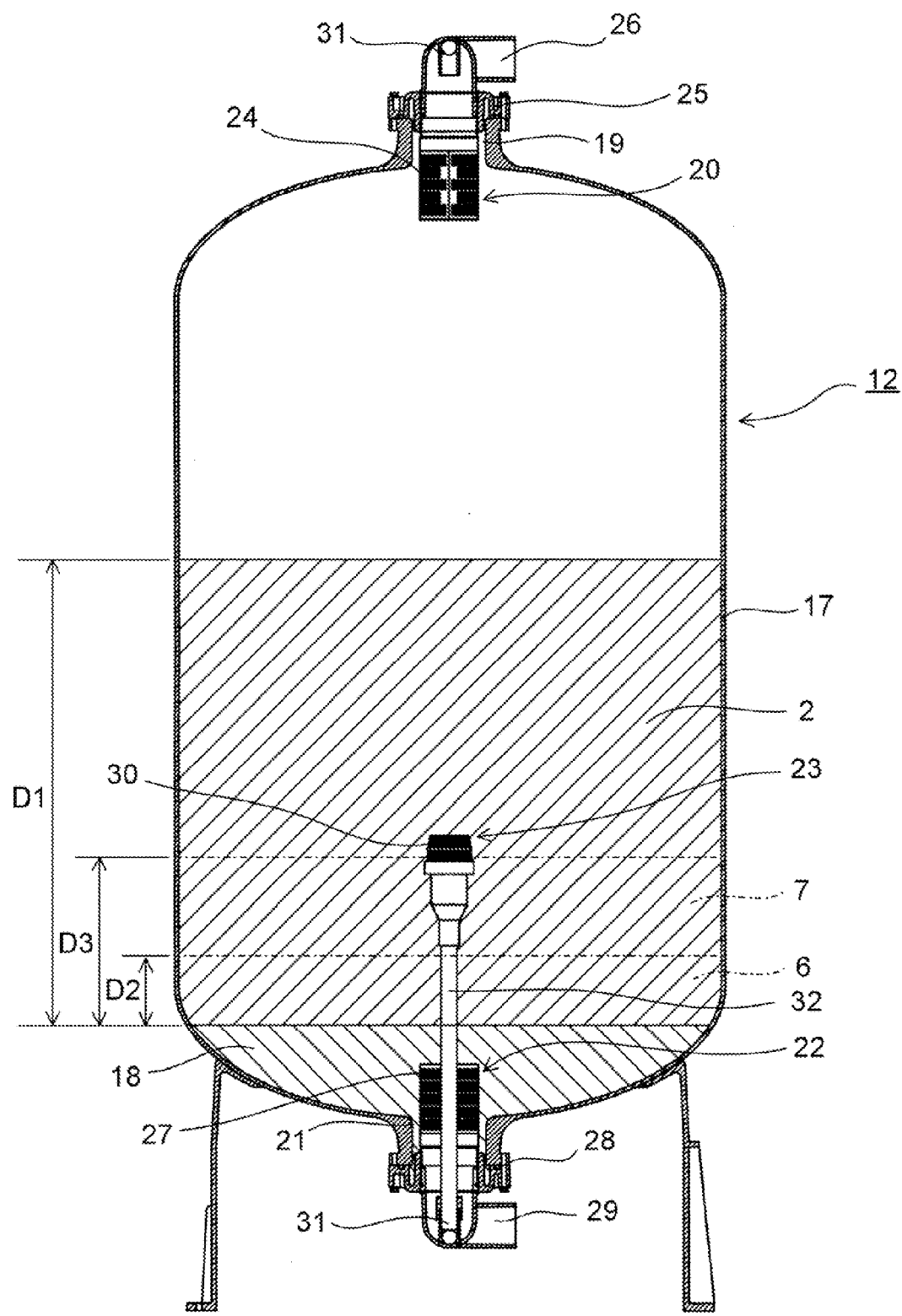
FIG. 7 is a view illustrating a vertical cross section of a resin storing tank in Example 1.

As illustrated in FIG. 7, the resin storing tank 12 has a vessel 17 molded into a single form at a time and made of synthetic resin. The bottom region of the vessel 17 is filled with a silica rock bed 18 made of fine silica rocks. A region of the vessel 17 above the silica rock bed 18 is filled with an ion exchange resin bed 2 made of strong acid cation exchange resin beads 2. A freeboard is formed above the ion exchange resin bed 2. The silica rock bed 18 fulfills a function of preventing the outflow of the resin beads and further making the flow of fluid uniform over any cross section of the ion exchange resin bed 2.

A first liquid-passing 20 is formed in a first opening 19 in the upper end of the vessel 17. In a second opening 21 in the lower end of the vessel 17, a second liquid-passing 22 and a third liquid-passing 23 are formed.

The first liquid-passing 20 has a cylindrical first screen 24, the lower end of which is closed, in order to prevent the outflow of the resin beads. The upper end of the first screen 24 is screwed into a ring-form first fixing member 25 fixed in the first opening 19. A first L-shaped pipe 26 is screwed and fixed into the first fixing member 25 from the upper of the member 25.

The second liquid-passing 22 has a cylindrical second screen 27, the upper end of which is closed. The lower end of the second screen 27 is screwed into a ring-form second fixing member 28 fixed in the second opening 21. A second L-shaped pipe 29 is screwed and fixed into the second fixing member 28 from the lower of the member 28.

The third liquid-passing 23 includes a third screen 30 and a liquid-collecting pipe 32. The third screen 30 is arranged at the middle of the ion exchange resin bed 2, and is connected through the liquid-collecting pipe 32 to an outflow opening 31 made in the second L-shaped pipe 29. The liquid-collecting pipe 32 is set to penetrate the upper end surface of the second screen 27. In the third screen 30, many holes (to which no reference number is attach) in a network form are made in the circumferential surface thereof in order to prevent the outflow of the resin beads. The many holes may be changed to an assembly of thin slits. The resin bed lower region 7 is defined as the region from the lower end of the lowest hole of the holes to the lower end of the ion exchange resin bed 2.

The first L-shaped pipe 26 and the second L-shaped pipe 29 are made of common components, respectively, for a decrease in costs. However, in the first L-shaped pipe 26, an outflow opening 31 is closed since the opening is not used. The outside diameter of the first screen 24 is made smaller than the inside diameter of the first opening 19. The outside diameters of the second screen 27 and the third screen 30 are each made smaller than the inside diameter of the second opening 21. Thus, the individual screens 24, 27 and 30 can be inserted into the resin storing tank 12 from the outside thereof so as to be assembled into the tank.

In Example 1, the bed depths D1 to D3 are set as follows:
the depth D1 of the ion exchange resin bed 2: 921 mm.
the depth D2 of the hardness leak prevention bed region 6: 100 mm, and
the depth D3 of the resin bed lower region 7: 250 mm.

Figure 8:
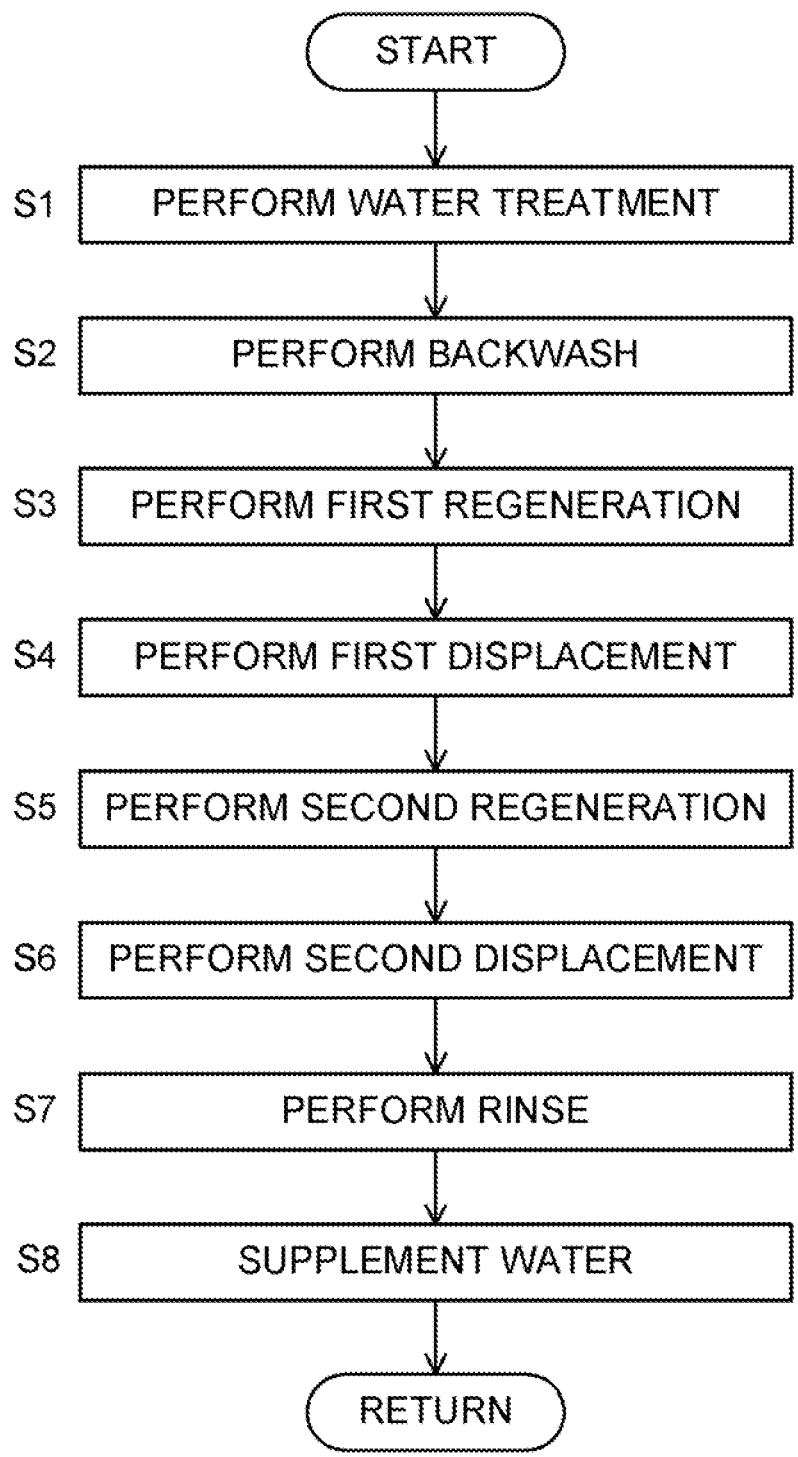
FIG. 8 is a flowchart of a process carried out through a controller.
Figure 9:
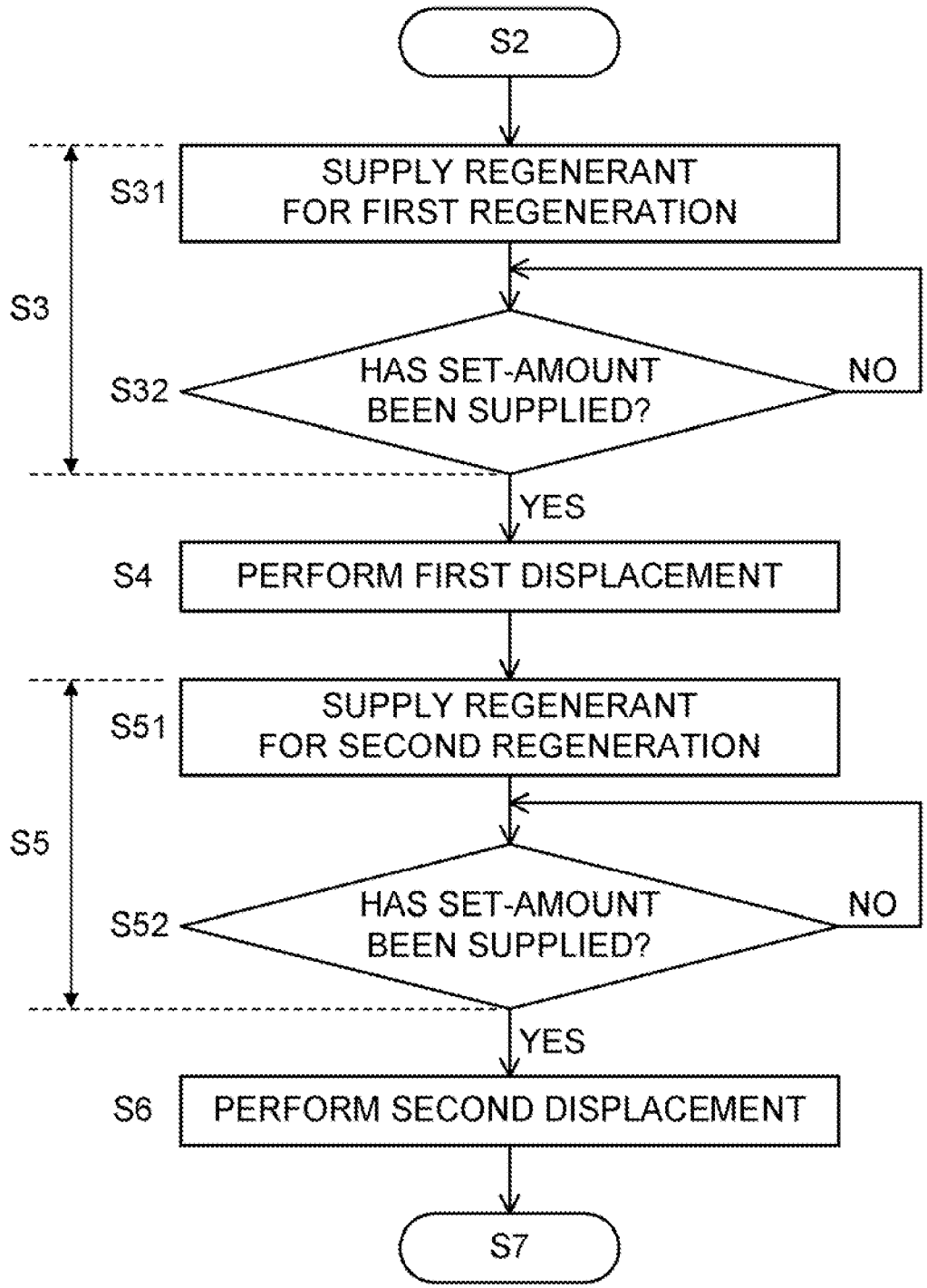
FIG. 9 is a flowchart showing details of first and second regeneration processes and displacement processes.

The control valves 13 switch steps in processes shown in FIGS. 8 and 9. Specifically, while the channels are switched through the control valves 13, the following steps 1 to 8 are performed in turn:

S1: a water treating process of passing raw water through the whole of the ion exchange resin bed 2 downwards in the vertical direction (water-softening process)

S2: a backwash process of passing raw water as a washing water through the whole of the ion exchange resin bed 2 upwards in the vertical direction S3: a first regeneration process of passing salt water as a regenerant through the whole of the ion exchange resin bed 2 downwards in the vertical direction S4: a first displacement process of passing raw water as a displacing water through the whole of the ion exchange resin bed 2 downwards in the vertical direction S5: a second regeneration process of passing salt water as the regenerant through the resin bed lower region 7 upwards in the vertical direction S6: a second displacement process of passing raw water as a displacing water through the resin bed lower region 7 upwards in the vertical direction S7: a rinse process of passing raw water as a rinsing water through the whole of the ion exchange resin bed 2 downwards in the vertical direction S8: water supplementing process of supplying raw water into the salt water supplier 14

Figure 11:
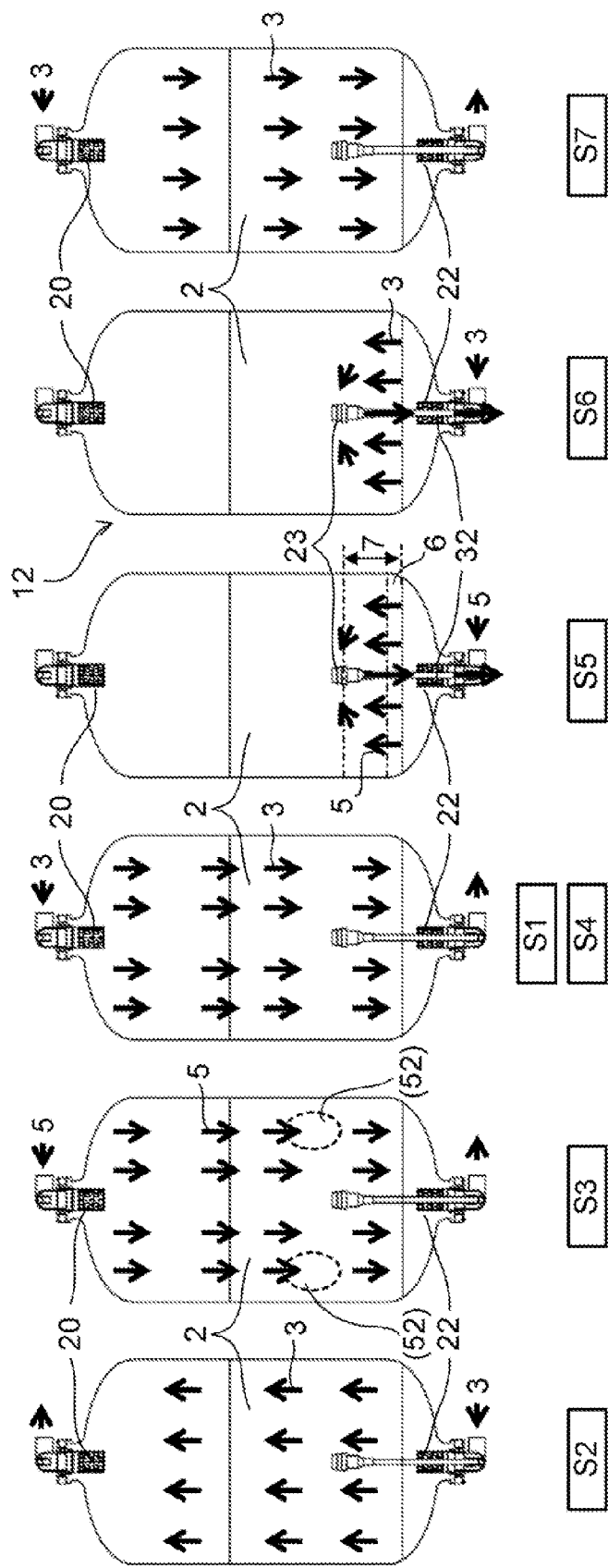
FIG. 11 is a view illustrating the flow of a concerned fluid in each of the processes.

The control valves 13 are formed to include a first valve M1 and a second valve M2 for controlling the passage of raw water and treated water; a third valve M3 for controlling a bypass; a fourth valve M4 for controlling the backwashing; a fifth valve M5 for controlling salt water; a sixth valve M6 and a seventh valve M7 for controlling an ejector: an eighth valve M8 for controlling discharged water; and a ninth valve M9 for controlling the rinsing. As illustrated in FIG. 10, in each of the processes S1 to S8, the open or the close of each of the valves M1 to M9 is controlled by the control unit 16. As a result, as illustrated in FIG. 11, in each of the processes S1 to S7, the flow of the related fluid is produced in the resin storing tank 12. Between the water treating process S1 and the backwash process S2, a regeneration waiting process (not illustrated) is set up wherein all the valves M1 to M9 are closed. After each of the water supplementing process S8 and the water treating process S1, a water-passage waiting process (not illustrated) is set up wherein all the valves M1 to M9 are closed.

As a result of the generation of the flows of the fluids illustrated in FIG. 11, the first liquid-passing section 20 functions as a liquid-distributing section or a liquid-collecting section. Specifically, in the water treating process S1, the first regeneration process S3, the first displacement process S4, and the rinse process S7, the first liquid-passing section 20 functions as a liquid-distributing section (the first liquid-distributing section in the invention). In the backwash process S2, the first liquid-passing section 20 functions as a liquid-collecting section.

The second liquid-passing section 22 functions as a liquid-distributing section or a liquid-collecting section. Specifically, in the backwash process S2 the second regeneration process S5, and the second displacement process S6, the second liquid-passing section 22 functions as a liquid-distributing section (the second liquid-distributing section in the invention). In the water treating process S1, the first regeneration process S3, the first displacement process S4, and the rinse process S7, the second liquid-passing section 22 functions as a liquid-collecting section (the first liquid-collecting section in the invention).

The third liquid-passing section 23 functions only as a liquid-collecting section. Specifically, in the second regeneration process S5, and the second displacement process S6, the third liquid-passing section 23 functions as a liquid-collecting section (the second liquid-collecting section in the invention).

In FIG. 6, reference number 33 represents a strainer: 34, an orifice; 35, the ejector: 36, a constant flow valve: and 37, a filter. The resin storing tank 12, the salt water supplier 14 and the valves M1 to M9, and the other elements are connected as illustrated in this figure through a first pipe 38-1, a second pipe 38-2, . . . and a twelfth pipe 38-20. The individual pipes 38 are pipes divided at branch points represented by black dots (to which no reference numbers are attached).

The control unit 16 is formed to include a microcomputer and memories (not illustrated). The control unit 16 receives the input of signals from a operating instructing unit 40, the salt water flow meter 15 and so on to control the control valves 13 and so on. In the memories is beforehand memorized a control program for carrying out the operating method of the invention.

The operating instructor 40 receives instructions of the start of the operating of the water softening apparatus 1, and the end thereof. The operating instructor 40 is formed in such a manner that in accordance with the hardness of raw water to be used, the total regeneration level R (g NaCl/L-R) through the whole of the regeneration process can be selected into any one of 5 levels of 60, 90, 120, 180 and 240 as illustrated in FIG. 12(a), so as to be inputted.

The control program memorized in the memories contains commands for carrying out processes shown in FIGS. 8 and 9. Specifically, the control program commands to carry out the two-stage regeneration composed of the first regeneration process S3, the first displacement process S4, the second regeneration process S5, and the second displacement process S6. As illustrated in FIG. 11, in the first regeneration process S3, the programs commands to distribute the regenerant 5 (salt water) to the top of the ion exchange resin bed 2 through the first liquid-passing section 20 and simultaneously collect the regenerant 5 at the bottom of the bed 2 through the second liquid-passing section 22, thereby generating a downward flow of the regenerant 5 to regenerate the whole of the bed 2. In the second regeneration process S5, the program commands to distribute the regenerant 5 (salt water) to the bottom of the ion exchange resin bed 2 through the second liquid-passing section 22 and simultaneously collect the regenerant 5 at the middle of the bed 2 through the third liquid-passing section 23, thereby generating an upward flow of the regenerant 5 to regenerate the resin bed lower region 7.

As illustrated in FIG. 12(a), according to the control program, the pattern of the distribution of the regenerant between the regeneration processes S3 and S5 is set into any one of P1 to P5 in accordance with the selected total regeneration level R. Specifically, when the total regeneration level R is selected from the range of 60 to 240 g NaCl/L-R, the regeneration level R2 in the second regeneration process S5 is automatically set into the range of 150 to 300 g NaCl/L-R. The regeneration level R2 is a value making it possible to produce soft water in the water treating process S1 to have a hardness leak quantity Y of 1 mg $CaCO_3$/L or less by effect of the hardness leak prevention bed region 6. In FIG. 12(a), the individual regeneration levels are shown by weight. When these levels are shown by equivalent (eq/L-R) on a premise that the molecular weight of NaCl is 58.5, the results are shown in FIG. 12(b).

In the automatic setting of the regeneration level R2, the regeneration level R2 is adjusted not to be over the upper limit (300 g NaCl/L-R) when the total regeneration level R is a predetermined value (120 g NaCl/L-R) or more. In short, the amount of the regenerant used for the hardness leak prevention bed region 6 is limited not to be larger than required. After the regeneration level R2 is set correspondingly to the total regeneration level R, the regeneration level R1 in the first regeneration process S3 is calculated as follows, and then automatically set up:

The total regenerant amount U (g NaCl) used through the whole of the regeneration process is obtained by multiplying the total regeneration level R by the resin amount of the ion exchange resin bed 2. The regenerant amount U2 (g NaCl) supplied to the hardness leak prevention bed region 6 in the second regeneration process S5 is obtained by multiplying the regeneration level R2 by the resin amount of the hardness leak prevention bed region 6. The regenerant amount U1 (g NaCl) supplied to the whole of the ion exchange resin bed 2 in the first regeneration process S3 is obtained by subtracting the regenerant amount U2 from the total regenerant amount U. The regeneration level R1 in the first regeneration process S3 is obtained by dividing the total regenerant amount U1 by the resin amount of the ion exchange resin bed 2. The regeneration level R21 for the resin bed lower region 7 is obtained by dividing the regenerant amount U2 by the resin amount of the resin bed lower region 7.

FIG. 13 shows the distribution ratio (U1/U or U2/U) of the regenerant. According to FIG. 13, in the second regeneration process S5, the regenerant is used in an amount of 14 to 27% of the total regenerant amount U. The regenerant amount U2 is preferentially secured as an amount required for producing soft water having a hardness leak quantity of 1 mg $CaCO_3$/L or less. In the first regeneration process S3, the regenerant is used in an amount of 86 to 73% of the total regenerant amount U. The remaining-regenerant amount U1 is secured to increase the water collection amount.

<Operating Method of the Water Softening Apparatus>

The following describes a method for operating the water softening apparatus according to Example 1. The description is made mainly about the water treating process S1, and the regeneration processes S3 and S5, which are related directly to the invention.

Operating Instruction:

Before the operating of the water softening apparatus 1, a user selects the total regeneration level R in advance through the operating instructing unit 40. Specifically, the user causes the operating instructing unit 40 to display the five patterns P1 to P5, and then selects one pattern therefrom in accordance with the hardness of raw water used. The user then operates a operating starting button (not illustrated) of the operating instructing unit 40. As a result thereof, the water treating process S1 is started in a case where the regeneration of the ion exchange resin bed 2 is already ended.

Water Treating Process S1:

In accordance with command signals from the control unit 16, about the control valves 13 (valves M1 to M9), the open or close states thereof are controlled as shown by S1 in FIG. 10. As a result, the raw water 3 flows through the pipes 38-1, 38-2, 38-3, 38-4 and 38-5 in turn, and is distributed from the first liquid-passing section 20 into the resin storing tank 12. The distributed raw water 3 passes in a downward flow form through the ion exchange resin bed 2. In the course thereof, hardness components are exchanged for Na ions so that the raw water is converted to soft water 4. The treated water (soft water) 4 that has passed through the ion exchange resin bed 2 is collected in the second liquid-passing section 22. Thereafter, the treated water flows through pipes 38-16, 38-13, 38-12 and 38-17 in turn, and is then supplied to a use point (see FIG. 6 and S1 in FIG. 11). When a predetermined amount of the treated water is collected so that the ion exchange resin bed 2 becomes unable to exchange any hardness component, the regeneration process is carried out.

Regeneration Process:

In the regeneration process, processes from the process S2 to the process S8 are successively performed in order to restore the harness removing capacity X of the ion exchange resin bed 2 (see FIG. 8). Of these processes, the backwash process S2, the rinse process S7, and the water supplementing process S8 are not related directly to the invention, and are well known as disclosed in Patent documents 1 and 2, and others; thus, any description thereof is omitted.

First Regeneration Process S2 in the Regeneration Process:

In accordance with command signals from the control unit 16, about the control valves 13 (valves M1 to M9), the open or close states thereof are controlled as shown by S3 in FIG. 10. As a result, the raw water 3 is supplied, as a diluted water, to the primary side of the ejector 35 through the pipes 38-1 and 38-15. In the ejector 35, a negative pressure is generated at the jetting-out side of a nozzle section thereof by effect of the passage of the raw water 3 therethrough. As a result, saturated salt water in the salt water supplier 14 is sucked through the pipe 38-18 into the ejector 35. In the ejector 35, the saturated salt water is diluted into a predetermined regenerant concentration C. In this way, the regenerant 5 (diluted salt water) is prepared. The regenerant 5 is supplied through the pipes 38-6 and 38-5 into the first liquid-passing section 20, and then distributed therefrom into the resin storing tank 12. The distributed regenerant 5 passes in a downward flow form through the ion exchange resin bed 2 to regenerate the whole of the ion exchange resin bed 2. The regenerant 5 that has passed through the ion exchange resin bed 2 is collected in the second liquid-passing section 22. The regenerant 5, which has been used, is discharged through the pipes 38-16, 38-13, 38-9, 38-19 and 38-20 to the outside of the system (see FIG. 6, and S3 in FIG. 11).

The first regeneration process S3 is a process for the so-called co-current regeneration. According to this co-current regeneration, regeneration-insufficiency portions (as represented by reference number 52 in FIG. 22) are not generated. The first regeneration process S3 is ended when the supplied volume Q1 of the regenerant 5 reaches the set regenerant amount U1, so that the present operating method process is shifted to the first displacement process S4 (see S31 and S32 in FIG. 9). When the specific gravity of the regenerant is represented by S, the supplied volume Q1 and the regenerant amount U1 have the following relationship:

$$U1 = C \times S \times Q1 \text{ wherein C: the above-mentioned regenerant concentration C.}$$

First Displacement Process S4 in the Regeneration Process:

In accordance with command signals from the control unit 16, about the control valves 13 (valves M1 to M9), the open or close states thereof are controlled as shown by S4 in FIG. 10. As a result, the raw water 3 flows, as a displacing water, through the pipes 38-1, 38-15, 38-6, and 38-5 in turn, and is distributed from the first liquid-passing section 20 into the resin storing tank 12. While the distributed raw water 3 displaces the previously introduced regenerant 5, the raw water 3 passes in a downward flow form through the ion exchange resin bed 2 so that the ion exchange resin bed 2 is continuously regenerated. The regenerant 5 and the raw water 3 that have passed through the ion exchange resin bed 2 are collected in the second liquid-passing section 22. The regenerant 5, which has been used, is discharged together with the raw water 3 to the outside of the system through the pipes 38-16, 38-13, 38-9, 38-19 and 38-20 (see FIG. 6, and S4 in FIG. 11).

Second Regeneration Process S5 in the Regeneration Process:

In accordance with command signals from the control unit 16, about the control valves 13 (valves M1 to M9), the open or close states thereof are controlled as shown by S5 in FIG. 10. As a result, the raw water 3 is supplied, as a diluted water, to the primary side of the ejector 35 through the pipes 38-1 and 38-15. The saturated salt water in the salt water supplier 14 is sucked through the pipe 38-18 into the ejector 35. In this way, the regenerant 5 (diluted salt water) having the predetermined regenerant concentration C is prepared. This regenerant 5 is supplied through the pipes 38-8 and 38-16 into the second liquid-passing section 22, and then distributed therefrom into the resin storing tank 12. The distributed regenerant 5 passes in an upward flow form through the resin bed lower region 7 to regenerate the region 7. The regenerant 5 that has passed through the resin bed lower region 7 is collected in the third liquid-passing section 23. The regenerant 5, which has been used, is discharged through the liquid-collecting pipe 32, and the pipes 38-10 and 38-20 to the outside of the system (see FIG. 6, and S5 in FIG. 11).

The second regeneration process S5 is a process for the so-called partial counter-current regeneration. In this partial counter-current regeneration, the hardness leak prevention bed region 6, which has not been sufficiently regenerated at the time of the first regeneration process S3, is first regenerated. The rest portion of the resin bed lower region 7 is regenerated by the regenerant 5 not used to regenerate the hardness leak prevention bed region 6. In the second regeneration process S5, the fluidization of the resin bed lower region 7 is restrained by the resin bed region (resin bed upper region) above the third liquid-passing section. When the second regeneration process S5 is ended when the supplied volume Q2 of the regenerant 5 reaches the set regenerant amount U2. The present operating method process is then shifted to the second displacement process S6 (see S51 and S52 in FIG. 9). When the specific gravity of the regenerant is represented by S, the supplied volume Q2 and the regenerant amount U2 have the following relationship:

$$U2 = C \times S \times Q2 \text{ wherein C: the above-mentioned regenerant concentration C in this process.}$$

Second Displacement Process S6 in the Regeneration Process:

In accordance with command signals from the control unit 16, about the control valves 13 (valves M1 to M9), the open or close states thereof are controlled as shown by S6 in FIG. 10. As a result, the raw water 3 flows, as a displacing water, through the pipes 38-1, 38-15, 38-6, 38-8 and 38-16 in turn, and is distributed from the second liquid-passing section 22 to the resin storing tank 12. While the distributed raw water 3 displaces the previously introduced regenerant 5, the water 3 passes in an upward flow form through the resin bed lower region 7 so that the region 7 is continuously regenerated. The regenerant 5 and the raw water 3 that have passed through the resin bed lower region 7 are collected in the third liquid-passing section 23. The regenerant 5, which has been used, is discharged together with the raw water 3 to the outside of the system through the liquid-collecting pipe 32, the pipes 38-10 and 38-20 (see FIG. 6, and S6 in FIG. 11).

In the pushing processes S4 and S6, about the water quality of the raw water used as the displacing water, the electroconductivity K is 1500 μS/cm or less, and the total hardness H is 500 mg CaCO$_3$/L or less. In particular, in the second displacement process S6, an operation is made to give a displacement volume N of 0.4 to 2.5 BV and a displacement linear velocity V2 of 0.7 to 2 m/h for the hardness leak prevention bed region 6.

<Advantageous Effects>

Advantageous effects of the water softening apparatus 1 according to Example 1 are described while compared with those of a water softening apparatus of a conventional regeneration manner about hardness removing capacity X, which shows the water collection amount of soft water, and hardness leak quantity Y, which shows the purity of soft water. The conventional water softening apparatus is an apparatus for performing split-flow regeneration or co-current regeneration.

EXPERIMENTAL EXAMPLE 1

In each of the water softening apparatus of two-stage regeneration type (Example 1), that of split-flow regeneration type (in the prior art), and that of co-current regeneration type (in the prior art), a regeneration process and a displacement process were performed under conditions described below. Thereafter, a water treating process was performed to examine properties of each of the water softening apparatus. The results are shown in FIGS. 14 and 15.

(1) Apparatus Conditions:
  Ion exchange resin amount: 800 L
  Ion exchange resin bed depth D1: 921 mm
  Resin bed lower region depth D3: 250 mm
  Ion exchange resin bed diameter Z: 1062 mm
(2) Raw Water Conditions:
  Total hardness H: 90 mg CaCO$_3$/L
  Electroconductivity K: 300 μS/cm
(3) Operating Conditions for the Regeneration Process:
  Total regeneration level: 60 g NaCl/L-R
  Regenerant distribution pattern: P5 (applied to the two-stage regeneration (see FIG. 12))
  Regenerant concentration C: 10% by weight
  Regeneration liner velocity V1: 1.5 m/h
(4) Operating Conditions for the Displacement Process:
  Displacement Volume N: 1.5 BV
  Displacement linear velocity V2: 1.0 m/h
(5) Operating Conditions for the Water Treating Process:
  Supplied water flow rate: 40 m$^3$/h (SV50)

Figures 14, 15:
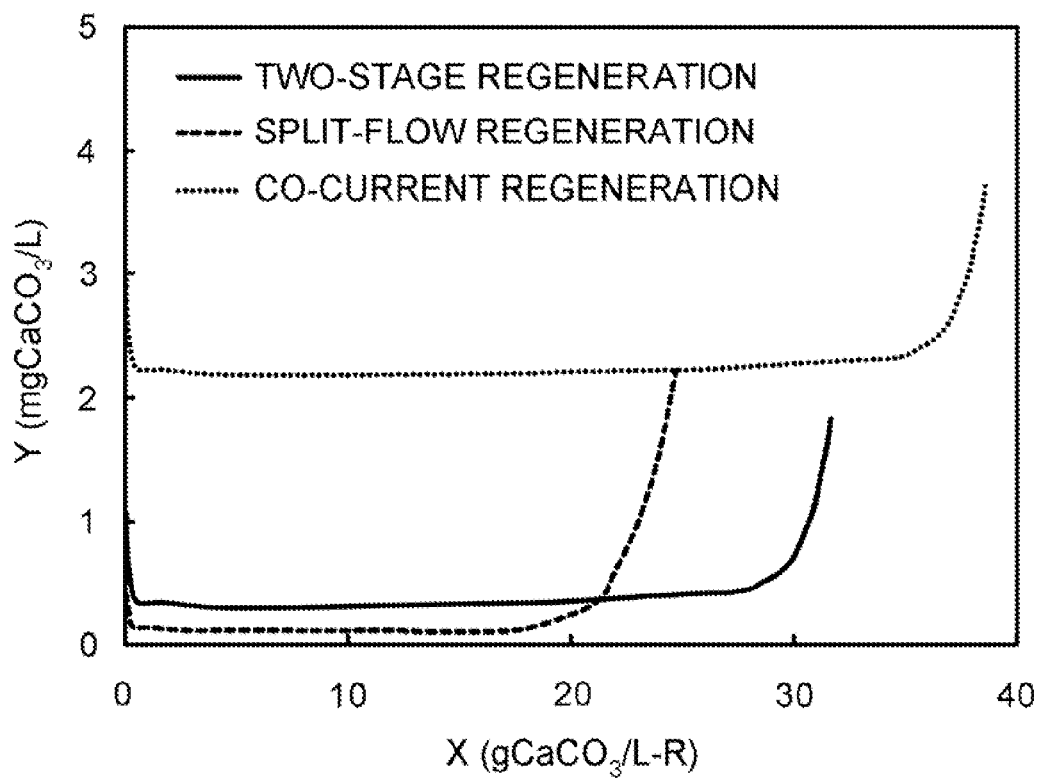
FIG. 14 is a graph showing a breakthrough curve of a water softening apparatus in Experimental Example 1.
FIG. 15 is a graph showing the breakthrough exchange capacity of the water softening apparatus in Experimental Example 1 and the average hardness leak quantity thereof.

FIG. 14 shows a change of the hardness leak quantity Y to the hardness removing capacity X, and is the so-called breakthrough curve. In other words, FIG. 14 is a characteristic chart showing a change in the hardness leak quantity Y with an increase in the water collection amount. In FIG. 15, the value of $X_{BTP}$ represents the hardness removing capacity (breakthrough exchange capacity) when the hardness leak quantity Y arrives at 1 mg CaCO$_3$/L (breakthrough point) in FIG. 14. In FIG. 15, the value of $Y_{AVE}$ shows the average leak hardness up to the breakthrough point in FIG. 14.

The results in FIG. 15 demonstrate that the $X_{BTP}$ value according to the two-stage regeneration was larger than that according to the split-flow regeneration. It is therefore possible to obtain a larger water collection amount in two-stage regeneration than in split-flow regeneration. In the two-stage regeneration, the $Y_{AVE}$ value was slightly larger than in the split-flow regeneration, but the orders of the $Y_{AVE}$ values in the two were equivalent to each other. It is therefore possible that according to two-stage regeneration a soft water purity equivalent to that according to split-flow regeneration is obtained. In the co-current regeneration, from a time just after the start of the water collection, the hardness leak quantity Y was over 2 mg CaCO$_3$/L, and the $X_{BTP}$ value and the $Y_{AVE}$ value were unable to be specified. In conclusion, co-current regeneration is, when the total regeneration level R is low (60 g NaCl/L-R), unsuitable for application to a case where high-purity soft water is required.

EXPERIMENTAL EXAMPLE 2

Figures 16, 17:
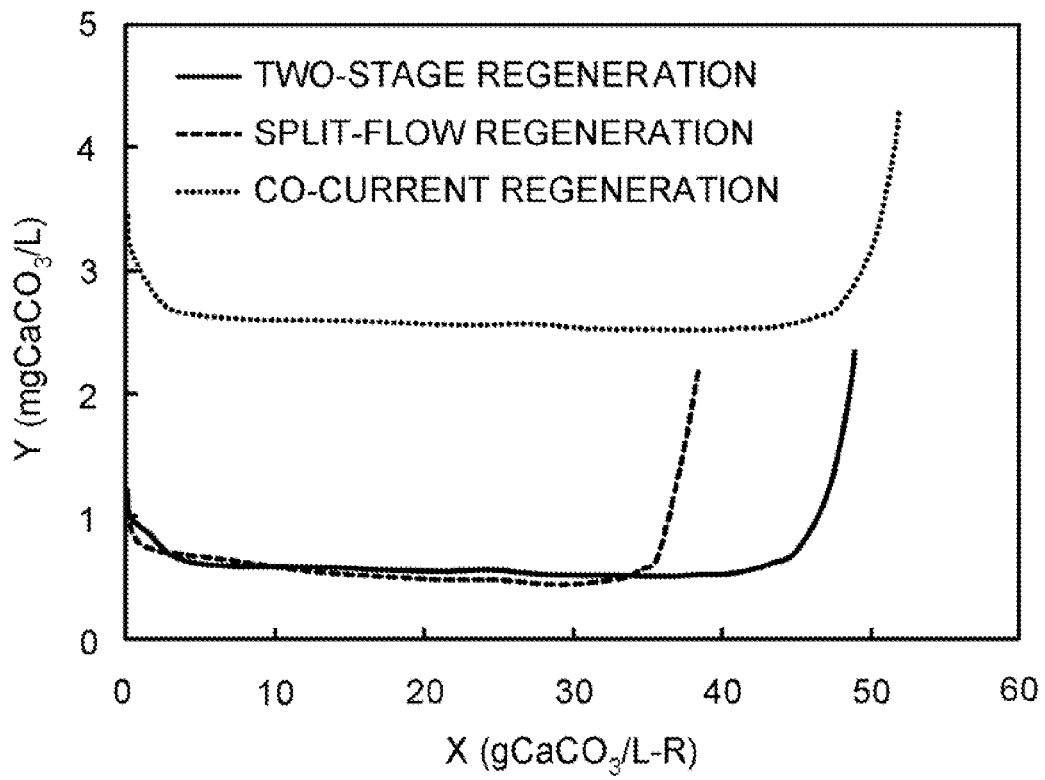
FIG. 16 is a graph showing a breakthrough curve of a water softening apparatus in Experimental Example 2.
FIG. 17 is a graph showing the breakthrough exchange capacity of the water softening apparatus in Experimental Example 2 and the average hardness leak quantity thereof.

The following describes properties obtained when the raw water conditions and the operating conditions for the regeneration process were changed in Experimental Example 1. The conditions used by the change in Experimental Example 2 were as follows:

(2') Raw Water Conditions:
  Total hardness H: 300 mg CaCO$_3$/L
  Electroconductivity K: 1000 pS/cm
(3') Operating Conditions for the Regeneration Process:
  Total regeneration level R: 120 g NaCl/L-R
  Regenerant distribution pattern: P3 (applied to the two-stage regeneration (see FIG. 12))
  Regenerant concentration C: 10% by weight
  Regeneration liner velocity V1: 1.5 m/h FIGS. 16 and 17 show the results of Experimental Example 2. According to the results, it is possible to obtain a larger water collection amount in two-stage regeneration than in split-flow regeneration. Furthermore, it is possible that according to two-stage regeneration a soft water purity equivalent to that according to split-flow regeneration is obtained. In the co-current regeneration, the total regeneration level R was made larger than in Experimental Example 1; in spite of the increase, soft water having a hardness leak quantity Y of 1 mg CaCO$_3$/L or less was unable to be obtained.

EXAMPLE 2

<Structure of Water Softening Apparatus>

In the same way as in Example 1, a water softening apparatus according to Example 2 is an apparatus for carrying out the processes S1 to S8 shown in FIGS. 8 and 9. However, the second regeneration process S5 and the second displacement process S6 are different therefrom in the following points:

S5': the second regeneration process of passing salt water as the regenerant upwards through the resin bed lower region 7 and simultaneously passing salt water downwards through the resin bed upper region S6': the second displacement process of passing raw water as the displacing water upwards through the resin bed lower region 7 and simultaneously passing raw water downwards through the resin bed upper region.

Figure 18:
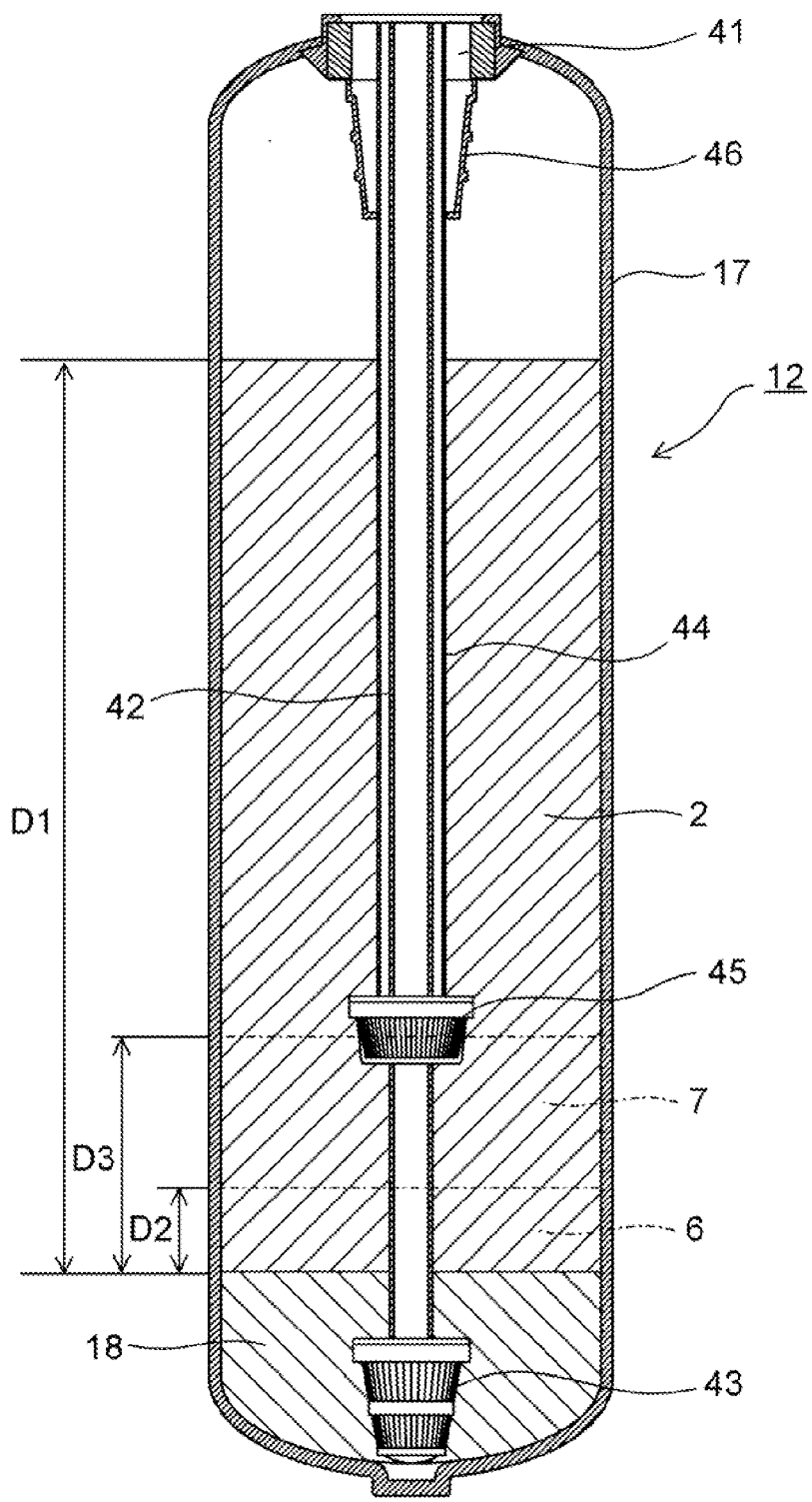
FIG. 18 is a view illustrating a vertical cross section of a resin storing tank in Example 2.

The resin storing tank 12 basically has the same structure as in Patent documents 1 and 2. As illustrated in FIG. 18, however, the tank 12 is different therefrom in that the position of the middle liquid-collecting section is made slightly lower.

To an opening 41 in the upper end of the resin storing tank 12 is connected a first collecting pipe 42 extending the vicinity of the bottom of a vessel 17. To the tip of the first collecting pipe 42 is fitted a fourth screen 43 for preventing the outflow of resin beads. To the opening 41 is also connected a second collecting pipe 44 extending a position having a depth D3. To the tip of the second collecting pipe 44 is fitted a fifth screen 45 for preventing the outflow of the resin beads. The central axes of the two collecting pipes 42 and 44 are set concentrically with the central axis of the resin storing tank 12. In short, the two collecting pipes 42 and 44 function as a collector having a double pipe structure. Furthermore, a sixth screen 46 is fitted to the opening 41 to cover the outside of the second collecting pipe 44.

The fourth screen 43 functions as a second liquid-distributing section and a first liquid-collecting section. The fifth screen 45 functions as a second liquid-collecting section. The sixth screen 46 functions as a first liquid-distributing section. The depth D3, which is the depth of a resin bed lower region 7, is set at a middle position between the highest of the upper ends of plural slits made in the side face of the fifth screen 45 and the lowest of the lower ends thereof. As control valves (not illustrated) for controlling the processes S1 to S8, for example, a control valve unit (3) described in Patent document 2 is used. FIG. 18 illustrates an embodiment wherein the ratio of the depth D1 of the ion exchange resin bed to the diameter Z of the bed (D1/Z) is made larger than the ratio in Example 1. However, this ratio may be made small as in Example 1.

<Method for Operating Water Softening Apparatus>

Figure 19:
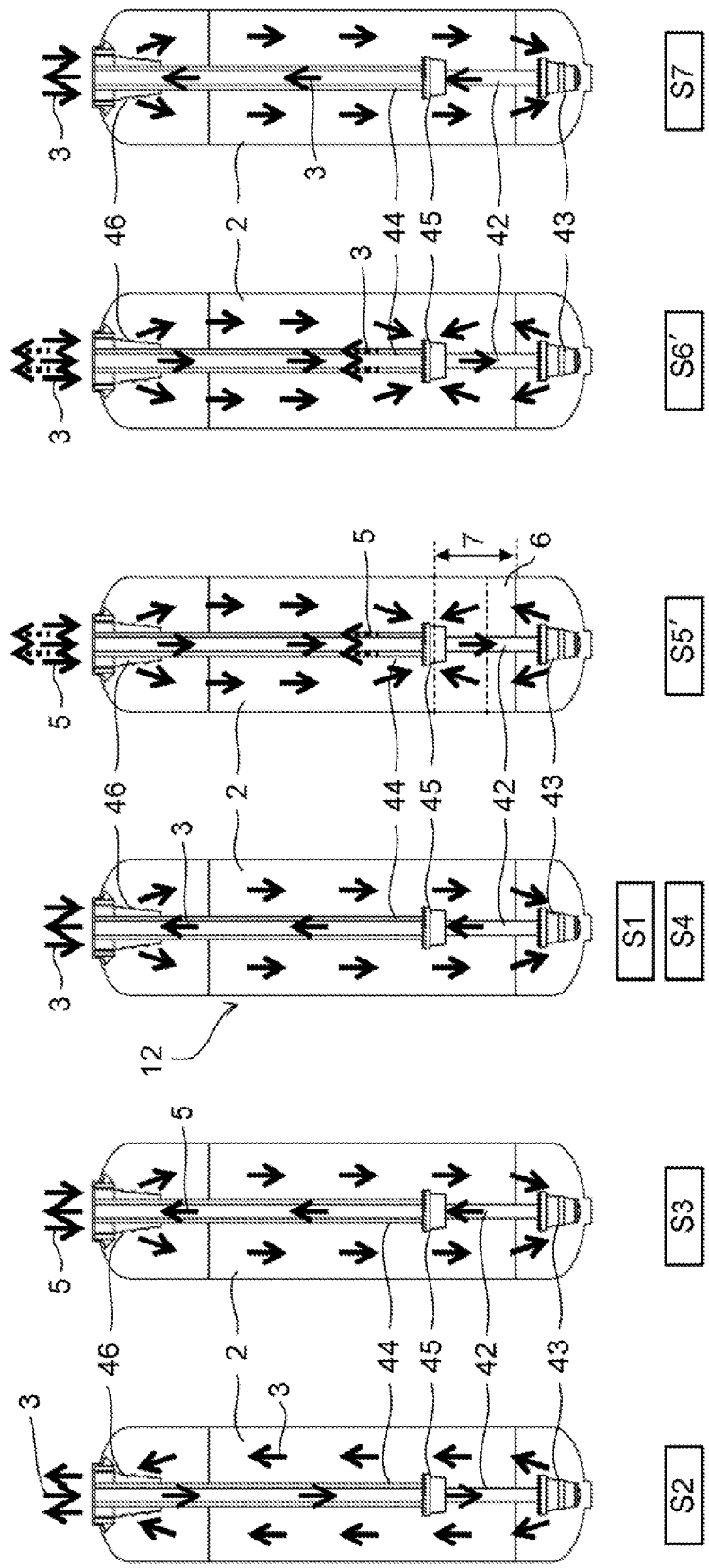
FIG. 19 is a view illustrating the flow of a concerned fluid in each process in Example 2.

With reference to FIG. 19, a description is made about operations of the water treating process and the regeneration process in Example 2. In FIG. 19, each arrow represents the flow of a concerned fluid.

Water Treating Process S1:

As shown by S1 in FIG. 19, raw water 3 is distributed from the sixth screen 46 into the resin storing tank 12. Inside the resin storing tank 12, the raw water 3 passes in a downward flow form through the ion exchange resin bed 2. In the course thereof, hardness components therein are exchanged for Na ions, so that the raw water 3 is converted to soft water 4. The treated water (soft water) 4 that has passed through the ion exchange resin bed 2 is collected in the fourth screen 43, and then passes through the first collecting pipe 42 to flow out to the outside of the resin storing tank 12.

First Regeneration Process S3 in the Regeneration Process:

As shown by S3 in FIG. 19, a regenerant 5 (diluted salt water) is distributed from the sixth screen 46 into the resin storing tank 12. The distributed regenerant 5 passes in a downward flow form through the ion exchange resin bed 2 to regenerate the whole of the bed 2. The regenerant 5 that has passed through the ion exchange resin bed 2 is collected in the fourth screen 43, and then passes through the first collecting pipe 42 to flow to the outside of the resin storing tank 12.

First Displacement Process S4 in the Regeneration Process:

As shown S4 in FIG. 19, the raw water 3 is distributed from the sixth screen 46 into the resin storing tank 12. While the distributed raw water 3 displaces the previously introduced regenerant 5, the raw water 3 passes in a downward flow form through the ion exchange resin bed 2 so that the bed 2 is continuously regenerated. The regenerant 5 and the raw water 3 that have passed through the ion exchange resin bed 2 are collected in the fourth screen 43. The regenerant 5, which has been used, is discharged together with the raw water 3 to the outside of the resin storing tank 12 through the first liquid-collecting tank 12.

Second Regeneration Process S5' in the Regeneration Process:

As shown by S5' in FIG. 19, a part of the regenerant (diluted salt water) 5 passes from the fourth screen 43 through the first collecting pipe 42 into the resin storing tank 12. The distributed regenerant 5 passes in an upward flow form through the resin bed lower region 7 to regenerate the region 7. The regenerant 5 that has passed through the resin bed lower region 7 is collected in the fifth screen 45, and then passes through the second collecting pipe 44 to flow to the outside of the resin storing tank 12. The flow flowing to the outside is represented by broken line arrows. The other part of the regenerant 5 is distributed from the sixth screen 46 into the resin storing tank 12. The distributed regenerant 5 passes in a downward flow form through the resin bed upper region to regenerate this resin bed upper region. The regenerant 5 that has passed through the resin bed upper region is collected in the fifth screen 45, and then passes through the second collecting pipe 44 to flow to the outside of the resin storing tank 12.

Second Displacement Process S6' in the Regeneration Process:

As shown in S6' in FIG. 19, a part of the raw water 3 passes from the fourth screen 43 through the first collecting pipe 42 into the resin storing tank 12. While the distributed raw water 3 displaced the previously introduced regenerant 5, the raw water 3 passes in an upward flow form through the resin bed lower region 7 so that the region 7 is continuously regenerated. The regenerant 5 and the raw water 3 that have passed through the resin bed lower region 7 are collected in the fifth screen 45. The regenerant 5, which has been used, is discharged together with the raw water 3 to the outside of the resin storing tank 12 through the second collecting pipe 44. The flow flowing to the outside is represented by broken line arrows. The other part of the raw water 3 is distributed from the sixth screen 46 into the resin storing tank 12. While the distributed raw water 3 pushes out the previously introduced regenerant 5, the water passes in a downward flow form through the resin bed upper region to regenerate this resin bed upper region continuously. The regenerant 5 and the raw water 3 that have passes through the resin bed upper region are collected in the fifth screen 45. The regenerant 5, which has been used, is discharged together with the raw water 3 to the outside of the resin storing tank 12 through the second collecting pipe 44. The raw water used in the second displacement process has an electroconductivity of 1500 .mu.S/cm or less and a total hardness of 500 mg $CaCO_3$/L. Regenerant is displaced from the hardness leak prevention bed region using a displacement volume N of 0.4 to 2.5 BV (bed volume) of the raw water supplied at a displacement linear velocity V2 of 0.7 to 2 m/h during the second displacement process.

<Effect Of The Invention>

Effect of the water softening apparatus according to Example 2 are described while compared with those of Example 1. The following Experimental Example 3 was performed on a premise that this example was consistent with Experimental Example 2 of Example 1 as much as possible in apparatus conditions, raw water conditions and operating conditions in order to compare Experimental Examples 3 and 2 with each other.

EXPERIMENTAL EXAMPLE 3

In the water softening apparatus of two-stage regeneration type (Example 2), a regeneration process and a displacement process were performed under conditions described below. Thereafter, a water treating process was performed to examine properties of the apparatus. The results are shown in FIGS. 20 and 21.

(1") Apparatus Conditions:
 Ion exchange resin amount: 800 L
 Ion exchange resin bed depth D1: 921 mm
 Resin bed lower region depth D3: 250 mm
 Ion exchange resin bed diameter Z: 1062 mm (2") Raw Water Conditions:
 Total hardness H: 300 mg $CaCO_3$/L
 Electroconductivity K: 100 μS/cm (3") Operating Conditions for the Regeneration Process:
Total regeneration level: 120 g NaCl/L-R
Regeneration level R1: 80 NaCl/L-R
Regeneration level R2: 184 NaCl/L-R (40 NaCl/L-R for the resin bed upper region and the resin bed lower region)
Regenerant concentration C: 10% by weight
Regeneration linear velocity: 1.5 m/h
(4") Operating Conditions for the Displacement Processes:
Displacement Volume N: 1.5 BV
Displacement linear velocity V2: 1.0 m/h
(5") Operating Conditions for the Water Treating Process:
Supplied water flow rate: 40 m$^3$/h (SV50)

Figures 20, 21:
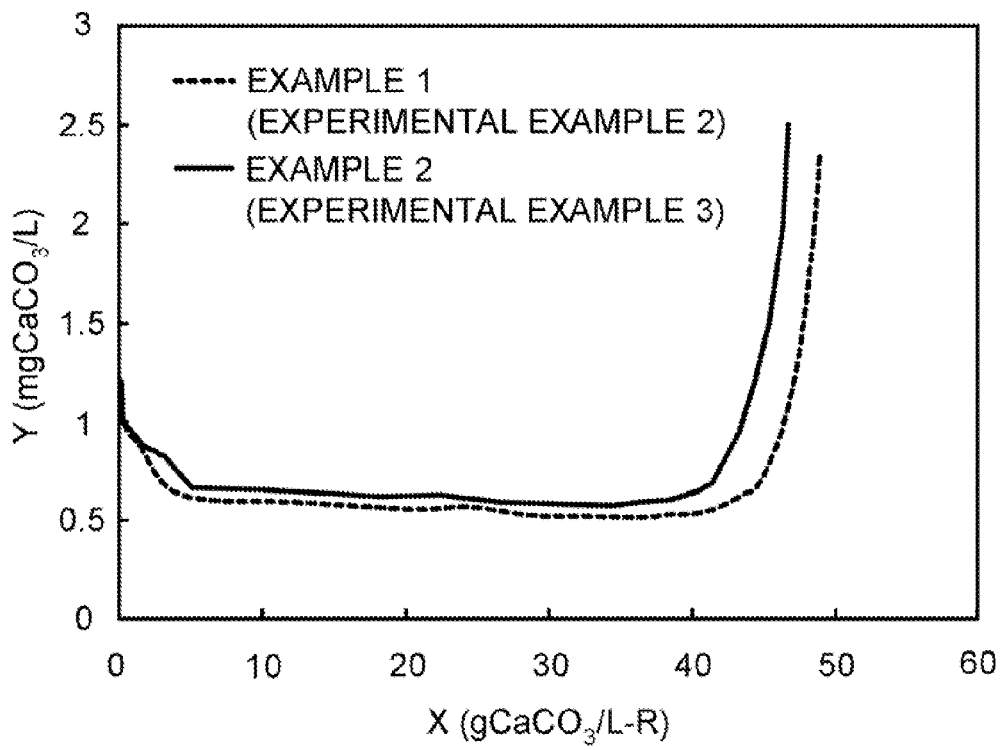
FIG. 20 is a graph showing a breakthrough curve of a water softening apparatus in Experimental Example 3.
FIG. 21 is a graph showing the breakthrough exchange capacity of the water softening apparatus in Experimental Example 3 and the average hardness leak quantity thereof.

The results in FIG. 21 demonstrate that the $X_{BTP}$ value in Example 2 was decreased from that in Example 1 by about 5%. The level of the $Y_{AVE}$ value in Example 2 was equal to that in Example 1. The decrease in the $X_{BTP}$ was slight; thus, Example 2 is useful as a modification of Example 1.

The present invention may be carried out in various forms without departing from the sprit thereof or main features thereof. Thus, the above-mentioned embodiments and Examples are merely instances in all ways, and should not be restrictedly interpreted. The scope of the invention is specified by the claims and is never restricted by the text of the specification. Furthermore, any modification or change belonging to a scope equivalent to the claims is included in the scope of the invention.

INDUSTRIAL APPLICABILITY

The invention may be used widely for water softening apparatus each connected to a system for which water having a low hardness is required, such as a boiler system or a reverse osmotic membrane system.

What is claimed is:

1. A method for operating an ion exchange equipment, which comprises a water treating process of passing raw water in a downward flow form through an ion exchange resin bed having a depth D1 to produce treated water, and a regeneration process of passing a regenerant through the ion exchange resin bed, wherein:
the ion exchange resin bed comprises ion exchange resin beads of the same type;
the regeneration process to restore the ion exchange resin bed to sufficient capacity using a set amount of regenerant comprises a first regeneration process that utilizes part of the regenerant, and a second regeneration process performed after the end of the first regeneration process that utilizes all remaining regenerant;
the first regeneration process is a process of distributing the regenerant to a top of the ion exchange resin bed and simultaneously collecting the regenerant at a bottom of the ion exchange resin bed, thereby generating a downward flow of the regenerant to regenerate the whole of the ion exchange resin bed; and
the second regeneration process is a process of distributing the regenerant to the bottom of the ion exchange resin bed and simultaneously collecting the regenerant at a middle of the ion exchange resin bed, thereby generating an upward flow of the regenerant to regenerate a part of the ion exchange resin bed.

2. The ion exchange equipment operating method according to claim 1, wherein the second regeneration process further comprises distributing the regenerant to the top of the of the ion exchange resin bed and simultaneously the collecting the regenerant at the middle of the ion exchange resin bed, thereby generating a downward flow of the regenerant to regenerate the other part of the ion exchange resin bed.

3. The ion exchange equipment operating method according to claim 2, wherein:
the ion exchange equipment is a water softening apparatus;
the ion exchange resin bed comprises strong acid cation exchange resin beads;
in the ion exchange resin bed having a depth D1 of 300 to 1500 mm, a hardness leak prevention bed region having a depth D2 of 100 mm is set on a premise that the base of the depths thereof is the bottom of the ion exchange resin bed;
the second regeneration process is a process of passing the regenerant through the hardness leak prevention bed region in a regenerant amount U2 which gives a regeneration level R2 of 1.0 to 6.0 eq/L-R to the hardness leak prevention bed region; and
the regeneration level R2 is a level at which in the water treating process after the second regeneration process, soft water can be produced to have a hardness leak quantity Y of 1 mg $CaCO_3$/L or less by effect of the hardness leak prevention bed region.

4. The ion exchange equipment operating method according to claim 3, wherein a position for the collection of the regenerant in the second regeneration process has a depth D3 which is set into the range of D2 to 0.8 times, D1 on a premise that the base of the depths is the bottom of the ion exchange resin bed.

5. The ion exchange equipment operating method according to claim 2, wherein:
the ion exchange equipment is a water softening apparatus;
the ion exchange resin bed comprises strong acid cation exchange resin beads;
after the first regeneration process, a first displacement process is performed wherein the raw water is distributed on the top of the ion exchange resin bed and simultaneously the raw water is collected at the bottom of the ion exchange resin bed, thereby generating a downward flow of the raw water to displace the introduced regenerant; and
after the second regeneration process, a second displacement process is performed wherein the raw water is distributed to the bottom and the top of the ion exchange resin bed and simultaneously the raw water is collected at the middle of the ion exchange resin bed, thereby generating an upward flow and a downward flow of the raw water to displace the introduced regenerant.

6. The ion exchange equipment operating method according to claim 5, wherein in the second displacement process, as the raw water, use is made of raw water having an electroconductivity of 1500 .mu.S/cm or less and a total hardness of 500 mg $CaCO_3$/L or less,
and in the hardness leak prevention bed region, the regenerant is displaced at a displacement volume N of 0.4 to 2.5 BV (bed volume) and a displacement linear velocity V2 of 0.7 to 2 m/h.

7. The ion exchange equipment operating method according to claim 1, wherein:
the ion exchange equipment is a water softening apparatus;
the ion exchange resin bed comprises strong acid cation exchange resin beads;
in the ion exchange resin bed having a depth D1 of 300 to 1500 mm, a hardness leak prevention bed region having a depth D2 of 100 mm is set on a premise that the base of the depths thereof is the bottom of the ion exchange resin bed;
the second regeneration process is a process of passing the regenerant through the hardness leak prevention bed region in a regenerant amount U2 which gives a regeneration level R2 of 1.0 to 6.0 eq/L-R to the hardness leak prevention bed region; and the regeneration level R2 is a level at which in the water treating process after the second regeneration process, soft water can be produced to have a hardness leak quantity Y of 1 mg $CaCO_3$/L or less by effect of the hardness leak prevention bed region.

8. The ion exchange equipment operating method according to claim 7, wherein a position for the collection of the regenerant in the second regeneration process has a depth D3 which is set into the range of D2 to 0.8×D1 on a premise that the base of the depths is the bottom of the ion exchange resin bed.

9. The ion exchange equipment operating method according, to claim 1, wherein:

the ion exchange equipment is a water softening apparatus;

the ion exchange resin bed comprises strong acid cation exchange resin beads;

after the first regeneration process, a first displacement process is performed wherein the raw water is distributed to the top of the ion exchange resin bed and simultaneously the raw water is collected at the bottom of the ion exchange resin bed, thereby generating a downward flow of the raw water to displace the introduced regenerant, and after the second regeneration process, a second displacement process is performed wherein the raw water is distributed to the bottom of the ion exchange resin bed and simultaneously the raw water is collected at the middle of the ion exchange resin bed, thereby generating an upward flow of the raw water to displace the introduced regenerant.

10. The ion exchange equipment operating method according to claim 9, wherein in the second displacement process, as the raw water, use is made of raw water having an electroconductivity of 1500 μS/cm or less and a total hardness of 500 mg $CaCO_3$/L or less, and in the hardness leak prevention bed region, the regenerent is displaced at a displacement volume N of 0.4 to 2.5 BV (bed volume) and a displacement linear velocity V2 of 0.7 to 2 m/h.

* * * * *